(12) United States Patent
Vorenkamp et al.

(10) Patent No.: US 7,936,546 B2
(45) Date of Patent: May 3, 2011

(54) APPARATUS AND METHOD FOR CLASSIFYING A POWERED DEVICE (PD) IN A POWER SOURCE EQUIPMENT (PSE) CONTROLLER

(75) Inventors: Pieter Vorenkamp, Laguna Niguel, CA (US); Agnes Woo, Encino, CA (US); Anil Tammineedi, Los Angeles, CA (US); Ichiro Fujimori, Irvine, CA (US); David Chin, Los Altos, CA (US); John Perzow, Fort Collins, CO (US)

(73) Assignee: Broadcom Corporation, Irvine, CA (US)

( * ) Notice: Subject to any disclaimer, the term of this patent is extended or adjusted under 35 U.S.C. 154(b) by 988 days.

(21) Appl. No.: 11/797,041

(22) Filed: Apr. 30, 2007

(65) Prior Publication Data

US 2007/0206774 A1 Sep. 6, 2007

Related U.S. Application Data

(63) Continuation of application No. 11/653,875, filed on Jan. 17, 2007.

(60) Provisional application No. 60/758,984, filed on Jan. 17, 2006.

(51) Int. Cl.
*H02H 3/00* (2006.01)
(52) U.S. Cl. ........................................................ 361/87
(58) Field of Classification Search .................. 323/266, 323/282, 901; 363/49; 361/90, 87
See application file for complete search history.

(56) References Cited

U.S. PATENT DOCUMENTS

| 4,215,317 | A | * | 7/1980 | Traynor | .................. 330/256 |
| 4,990,845 | A | | 2/1991 | Gord | |
| 5,081,379 | A | | 1/1992 | Korteling | |
| 5,220,207 | A | | 6/1993 | Kovalcik et al. | |
| 5,457,811 | A | | 10/1995 | Lemson | |

(Continued)

OTHER PUBLICATIONS

All You Need to Know About Power over Ethernet (POE) and the IEEE 802.3af Standard; Galit Mendelson; Senior Product Manager; Jun. 2004).*

(Continued)

*Primary Examiner* — Adolf Berhane
*Assistant Examiner* — Yemane Mehari
(74) *Attorney, Agent, or Firm* — Sterne, Kessler, Goldstein & Fox P.L.L.C.

(57) ABSTRACT

Power over Ethernet (PoE) communication systems provide power and data communications over the same communications link, where a power source device (PSE) provides DC power (for example, 48 volts DC) to a powered device (PD). The DC power is transmitted simultaneously over the same communications medium with the high speed data from one node to the other node. The PSE typically includes a controller that controls the DC power provided to the PD at the second node of the communications link. The PSE controller measures the voltage, current, and temperature of the outgoing and incoming DC supply lines to characterize the power requirements of the PD. In addition, the PSE controller may detect and validate a compatible PD, determine a power classification signature for the validated PD, supply power to the PD, monitor the power, and reduce or remove the power from the PD when the power is no longer requested or required. During detection, if the PSE finds the PD to be non-compatible, the PSE can prevent the application of power to that PD device, protecting the PD from possible damage.

29 Claims, 26 Drawing Sheets

U.S. PATENT DOCUMENTS

| | | | |
|---|---|---|---|
| 5,519,310 | A | 5/1996 | Bartlett |
| 5,789,971 | A | 8/1998 | Colletti et al. |
| 5,838,145 | A | 11/1998 | Poon et al. |
| 5,943,226 | A | 8/1999 | Kim |
| 6,002,237 | A | 12/1999 | Gaza |
| 6,011,413 | A | 1/2000 | Hayakawa et al. |
| 6,184,659 | B1 | 2/2001 | Darmawaskita |
| 6,198,342 | B1 | 3/2001 | Kawai |
| 6,280,081 | B1 | 8/2001 | Blau et al. |
| 6,300,749 | B1 | 10/2001 | Castelli et al. |
| 6,304,472 | B1 | 10/2001 | Nagasu et al. |
| 6,335,657 | B1 | 1/2002 | Hayase et al. |
| 6,414,404 | B1 | 7/2002 | Allen |
| 6,452,766 | B1 | 9/2002 | Carper |
| 6,456,044 | B1 | 9/2002 | Darmawaskita |
| 6,480,057 | B2 | 11/2002 | Ogura |
| 6,515,489 | B2 | 2/2003 | Min et al. |
| 6,535,983 | B1 | 3/2003 | McCormack et al. |
| 6,600,690 | B1 | 7/2003 | Nahas et al. |
| 6,717,787 | B2 | 4/2004 | Barker |
| 6,734,717 | B2 | 5/2004 | Min |
| 6,750,701 | B2 | 6/2004 | Kawasumi |
| 6,798,177 | B1 | 9/2004 | Liu et al. |
| 6,853,180 | B2 | 2/2005 | Neumann et al. |
| 6,940,737 | B2 | 9/2005 | Nakazawa et al. |
| 6,960,949 | B2 | 11/2005 | Suzuki |
| 6,998,831 | B2 | 2/2006 | Charlon |
| 7,046,983 | B2 * | 5/2006 | Elkayam et al. .......... 455/402 |
| 7,050,315 | B2 | 5/2006 | Itoh |
| 7,061,327 | B2 | 6/2006 | Doy |
| 7,161,393 | B1 | 1/2007 | Potanin et al. |
| 7,183,857 | B2 | 2/2007 | Doy et al. |
| 7,262,628 | B2 * | 8/2007 | Southwell et al. .......... 324/769 |
| 7,281,141 | B2 | 10/2007 | Elkayam et al. |
| 7,372,685 | B2 | 5/2008 | Beck et al. |
| 7,373,528 | B2 | 5/2008 | Schindler |
| 7,417,877 | B2 | 8/2008 | Leung et al. |
| 7,432,696 | B1 | 10/2008 | De Stasi |
| 7,492,108 | B2 | 2/2009 | Garcia et al. |
| 7,525,333 | B1 | 4/2009 | Bertin |
| 7,548,626 | B2 * | 6/2009 | Stenberg et al. .......... 381/113 |
| 7,564,214 | B2 * | 7/2009 | Sasaki et al. .......... 320/106 |
| 7,592,899 | B2 * | 9/2009 | Holt et al. .......... 340/310.11 |
| 7,612,470 | B2 * | 11/2009 | Pincu et al. .......... 307/85 |
| 7,627,398 | B1 * | 12/2009 | Bennett et al. .......... 700/286 |
| 2002/0093366 | A1 | 7/2002 | Fotouhi |
| 2003/0099076 | A1 | 5/2003 | Elkayam et al. |
| 2003/0155963 | A1 | 8/2003 | Huang |
| 2004/0008070 | A1 | 1/2004 | Abe et al. |
| 2004/0201931 | A1 * | 10/2004 | Korcharz et al. .......... 361/18 |
| 2005/0030200 | A1 | 2/2005 | Holt |
| 2005/0132240 | A1 | 6/2005 | Stineman et al. |
| 2005/0162202 | A1 | 7/2005 | Suzuki |
| 2005/0253645 | A1 | 11/2005 | North |
| 2006/0045531 | A1 | 3/2006 | Killmeyer et al. |
| 2006/0092000 | A1 | 5/2006 | Karam et al. |
| 2006/0112285 | A1 | 5/2006 | Stineman |
| 2006/0132220 | A1 | 6/2006 | Lee |
| 2006/0164769 | A1 * | 7/2006 | Stanford et al. .......... 361/87 |
| 2006/0164775 | A1 | 7/2006 | Stineman et al. |
| 2007/0165345 | A1 | 7/2007 | Woo |
| 2007/0165548 | A1 | 7/2007 | Woo |
| 2007/0170909 | A1 | 7/2007 | Vorenkamp et al. |
| 2008/0040625 | A1 | 2/2008 | Vorenkamp et al. |
| 2008/0079434 | A1 | 4/2008 | Oosawa et al. |
| 2009/0096531 | A1 | 4/2009 | Shimamoto et al. |

OTHER PUBLICATIONS 802.3af™, *IEEE Standard for Information Technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Data Terminal Equipment (DTE) Power via Media Dependent Interface (MDI)*, IEEE Computer Society, IEEE, New York, NY, ISBN 0-7381-3696-4 (SH95132) (Print), ISBN 0-7381-3697-2 (SS95132) (PDF), Jun. 18, 2003, pp. i-ix and 1-121 (133 pages total).

International Search Report for PCT/US2007/001119, Filed Jan. 17, 2007, 14 pages.

Mendelson, G., "All You Need to Know About Power over Ethernet (PoE) and the IEEE 802.3af Standard," Internet Citation, [Online] Jun. 2004, XP002372480 Retrieved from the Internet: <URL:http://www.powerdsine.com/Documentation/WhitePapers/PoE_and_IEEE802_3af.pdf> [retrieved on Mar. 26, 2006].

* cited by examiner

APPARATUS AND METHOD FOR CLASSIFYING A POWERED DEVICE (PD) IN A POWER SOURCE EQUIPMENT (PSE) CONTROLLER

CROSS REFERENCE TO RELATED APPLICATIONS

This patent application is a continuation of U.S. patent application Ser. No. 11/653,875, filed Jan. 17, 2007, entitled "Power Over the Ethernet Controller Integrated Circuit Architecture," which claims the benefit of U.S. Provisional Patent Application No. 60/758,984, filed Jan. 17, 2006, entitled "Power Over the Ethernet," all of which are incorporated by reference herein.

BACKGROUND OF THE INVENTION

1. Field of the Invention

The present invention generally relates to Power over Ethernet (PoE) devices, and more specifically to classification of a powered device (PD).

2. Related Art

Ethernet communications provide high speed data communications over a communications link between two communications nodes that operates according the IEEE 802.3 Ethernet Standard. The communications medium between the two nodes can be twisted pair wires for Ethernet, or other types communications medium that are appropriate. Power over Ethernet (PoE) communication systems provide power and data communications over a common communications link. More specifically, a power source device (PSE) connected to the physical layer of the first node of the communications link provides DC power (for example, 48 volts DC) to a powered device (PD) at the second node of the communications link. The DC power is transmitted simultaneously over the same communications medium with the high speed data from one node to the other node.

The PSE typically includes a controller that controls the DC power provided to the PD at the second node of the communications link. The PSE controller measures the voltage, current, and temperature of the outgoing and incoming DC supply lines to characterize the power requirements of the PD. In addition, the PSE controller may detect and validate a compatible PD, determine a power classification signature for the validated PD, supply power to the PD, monitor the power, and reduce or remove the power from the PD when the power is no longer requested or required. During detection, if the PSE finds the PD to be non-compatible, the PSE can prevent the application of power to that PD device, protecting the PD from possible damage.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Figure 1:
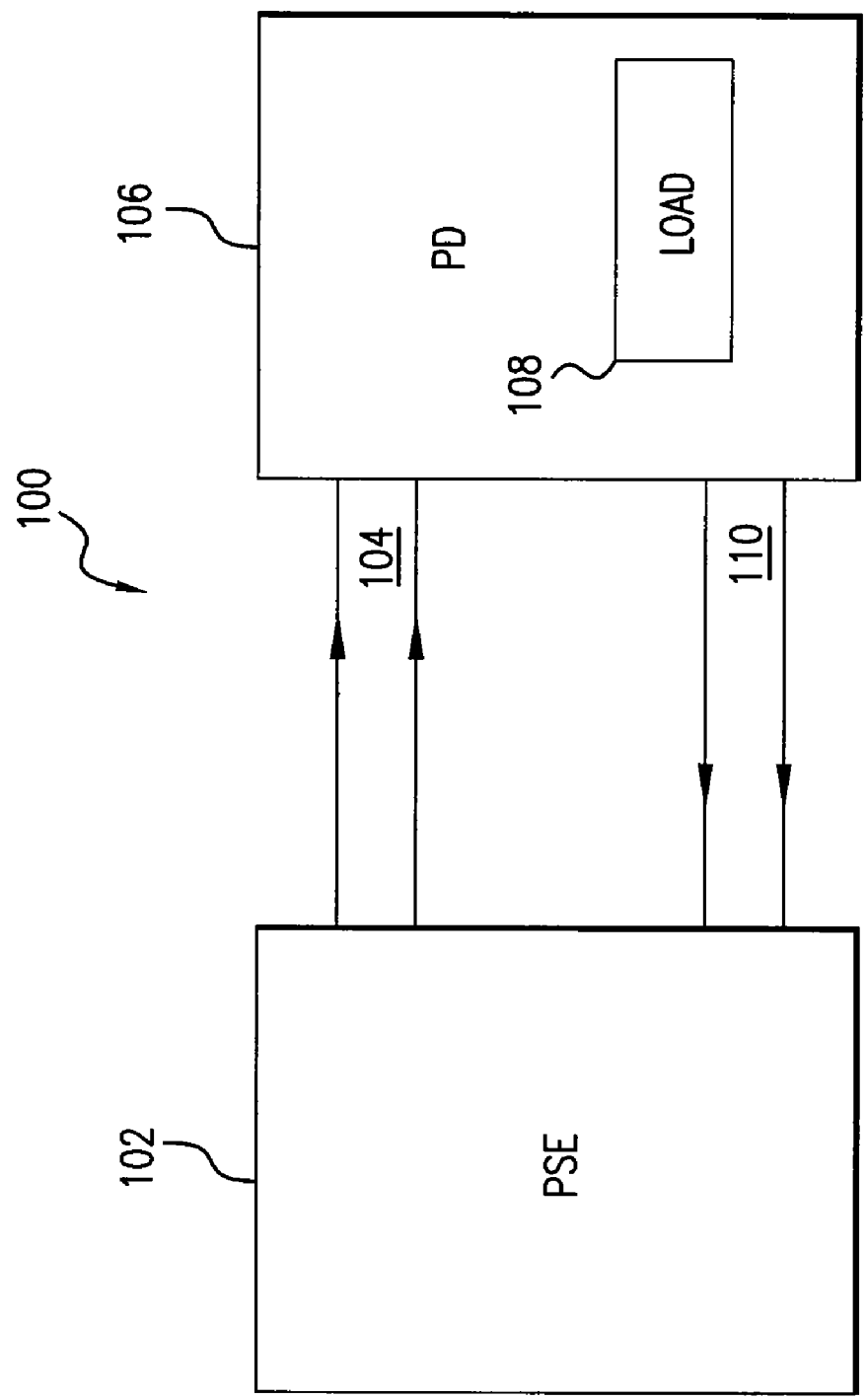
FIG. 1 is a block diagram of a conventional Power over Ethernet (PoE) system.

FIG. 1 illustrates a high level diagram of a conventional Power over Ethernet (PoE) system 100 that provides both DC power and data communications over a common data communications medium. Referring to FIG. 1, power source equipment 102 provides DC power over conductors 104, 110 to a powered device (PD) 106 having a representative electrical load 108. The PSE 102 and PD 106 also include data transceivers that operate according to a known communications standard, such as the IEEE Ethernet standard. More specifically, the PSE 102 includes a physical layer device on the PSE side that transmits and receives high speed data with a corresponding physical layer device in the PD 106, as will be discussed further below. Accordingly, the power transfer between the PSE 102 and the PD 106 occurs simultaneously with the exchange of high speed data over the conductors 104, 110. In one example, the PSE 102 is a data switch having multiple ports that is communication with one or more PD devices, such as Internet phones, or a wireless access point.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

Figure 2A:
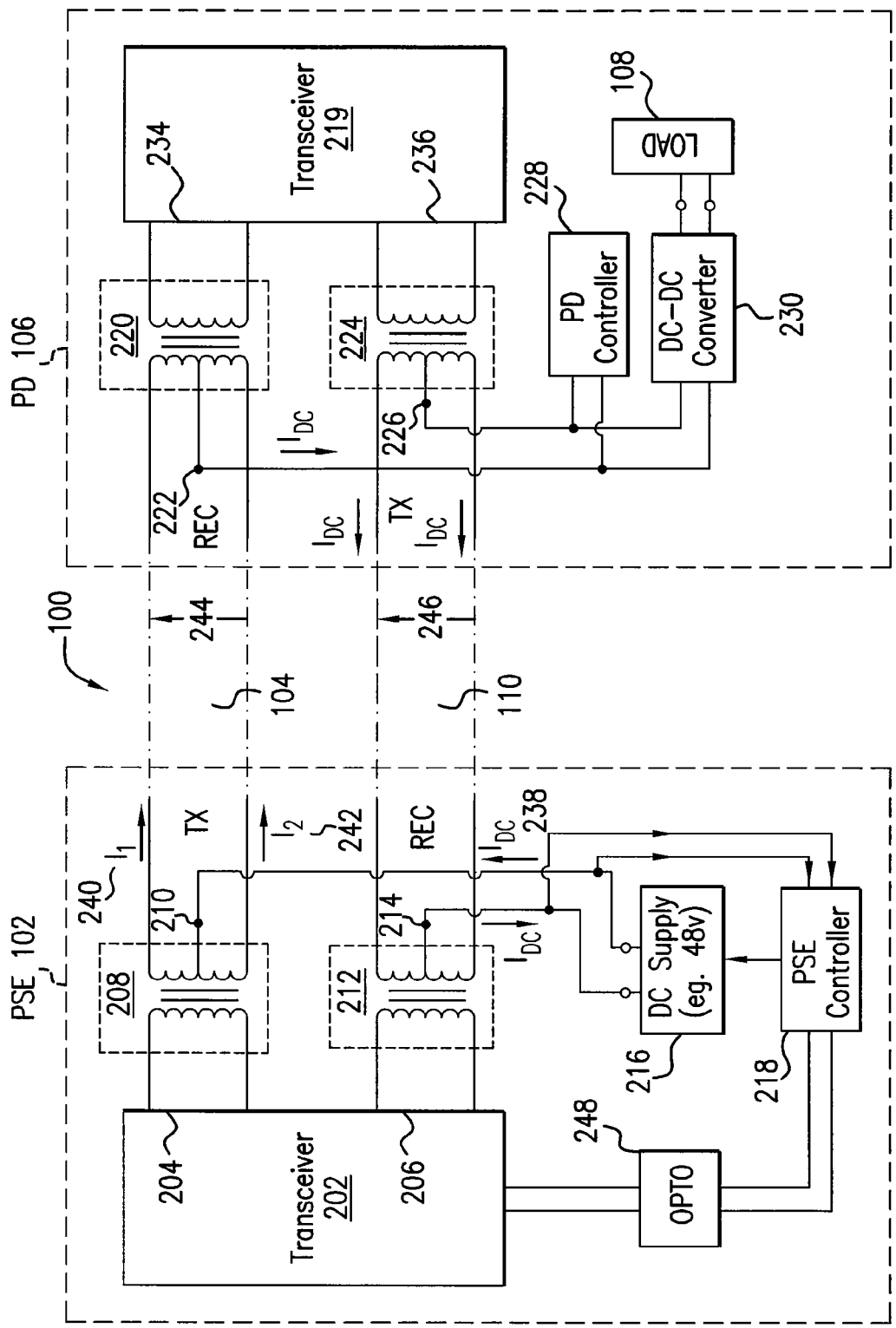
FIG. 2A illustrates a more detailed figure of the conventional power transfer from the Power Source Equipment (PSE) to the Powered Device (PD) in a conventional PoE communications system.

FIG. 2A provides a more detailed circuit diagram of the PoE system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 210 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the transceiver 202. An example DC output voltage is 48 volts, but other voltages could be used depending on the voltage/power requirements of the PD 106.

The PSE 102 further includes a PSE controller 218 that controls the DC voltage supply 216 based on the dynamic needs of the PD 106. More specifically, the PSE controller 218 measures the voltage, current, and temperature of the outgoing and incoming DC supply lines so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3af™ standard, which is incorporated herein by reference.

Still referring to FIG. 2A, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 110 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216. As discussed above, data transmission between the PSE 102 and the PD 106 occurs simultaneously with the DC power supply described above. Accordingly, a first communication signal 244 and/or a second communication signal 246 are simultaneously differentially carried via the conductor pairs 104 and 110 between the PSE 102 and the PD 106. It is important to note that the communication signals 244 and 246 are differential signals that ideally are not effected by the DC power transfer.

Figure 2B:
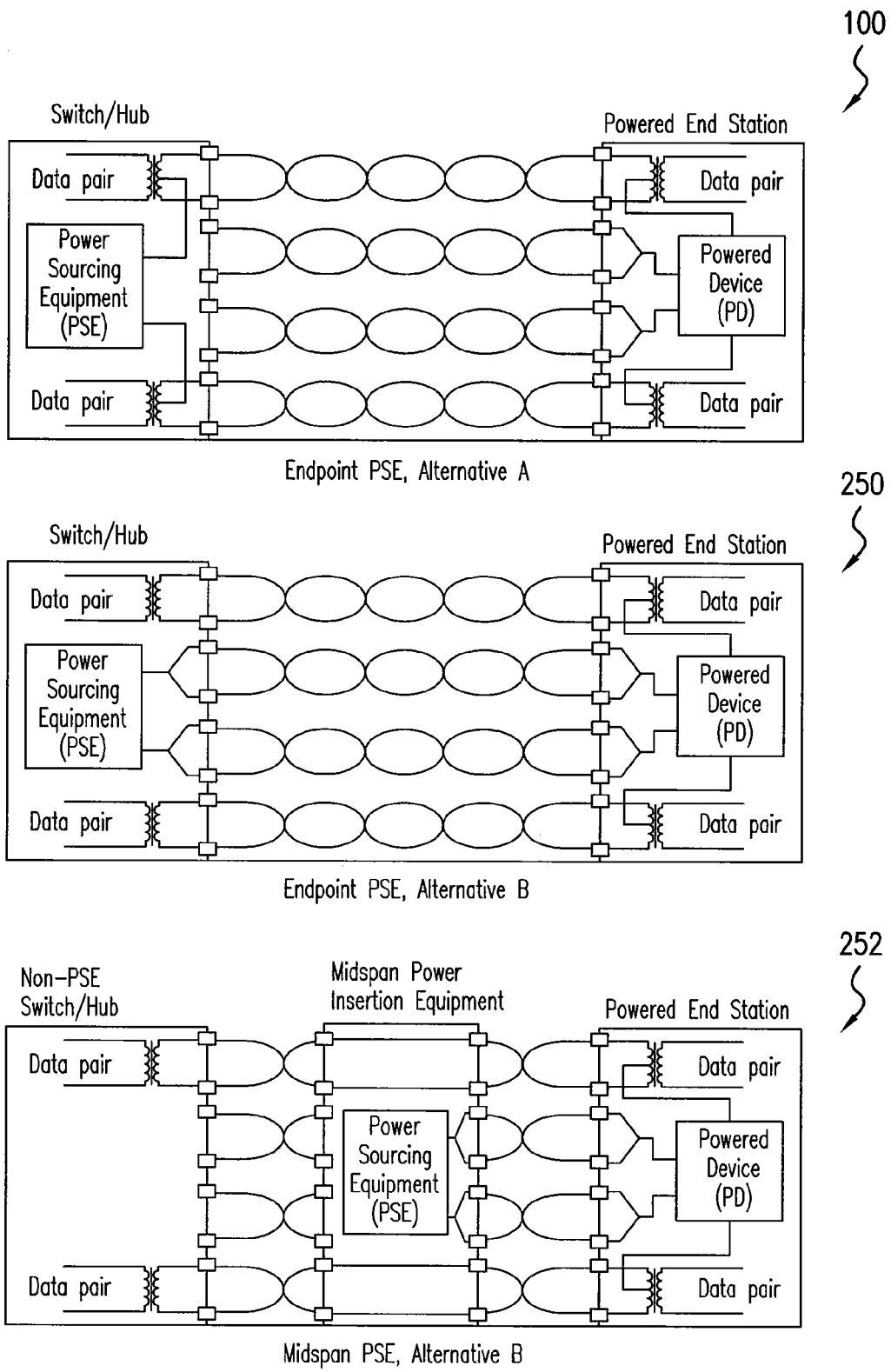
FIG. 2B illustrates exemplary configurations for supplying power from the Power Source Equipment (PSE) to the Powered Device (PD) in a conventional PoE communications system.

FIG. 2A represents an Alternative A configuration for supplying power to a PD. Persons of skill in the art would appreciate other alternative configurations can be used to supply power to a PD. For example, FIG. 2B illustrates exemplary configurations for supplying power from the Power Source Equipment (PSE) to the Powered Device (PD) in a conventional PoE communications system. The Endpoint PSE, Alternative A configuration 100 is the configuration for supplying power from the PSE to the PD as previously described in FIG. 2A. The Endpoint PSE, Alternative B configuration 250 represents a configuration for supplying power from the PSE to the PD where two of the pairs of conductors carry data and the remaining two pairs of conductors are used to power the PD. More specifically, the two center pairs of conductors carry the power only, and the two outer pairs of conductors carry the data only. Accordingly, the center pair of conductors does not require transformers because the data and power are carried on separate dedicated conductor pairs. The Midspan PSE, Alternative B 252 represents a third configuration for supplying power from the PSE to the PD. In the Midspan configuration, the midspan includes the PSE and applies the power to data from a non-PSE switch/hub so that the non-PSE switch/hub can interface with a PD device as shown in Alternative 252. As shown, the data and power are carried on separate conductors. Further description of the Midspan PSE, Alternative B 252 is given in U.S. patent application Ser. No. 11/518,942, entitled "Inband Management for Power Over Ethernet Midspan Using an Embedded Switch" filed on Sep. 12, 2006, which is incorporated by reference in its entirety. The PSE controller described in the following description can be used in any one of the alternatives PoE configurations described in FIG. 2A or 2B.

Figure 3A:
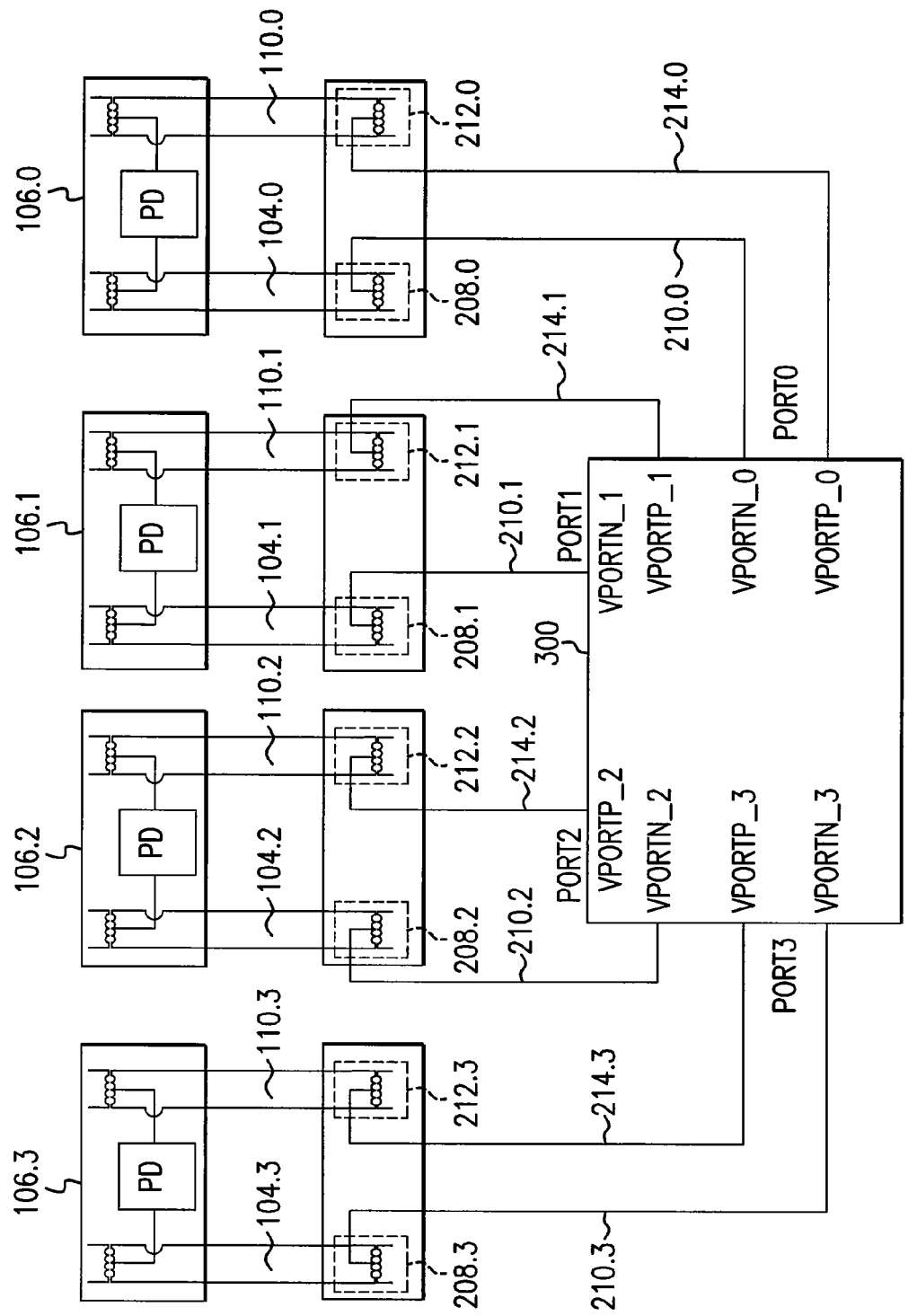
FIG. 3A is an illustration of a block diagram of a Power Source Equipment (PSE) controller according to an embodiment of the present invention.

FIG. 3A is an illustration of a block diagram of a Power Source Equipment (PSE) controller 300 according to an embodiment of the present invention. The PSE controller 300 is an exemplary embodiment for the PSE controller 218 and implements a four port solution allowing the PSE controller 300 to simultaneously communicate to four PDs. Those skilled the arts will recognize that the teachings contained within may be applied are equally applicable to an n port solution. As shown in FIG. 3A, a corresponding PD 106.0 through 106.3 connects to PSE controller 300 through corresponding conductors 104.0 through 104.3, and 110.0 through 110.3. PD 106.3 attaches to pins VPORTP_3 and VPORTN_3 via center tap 214.3 and center tap 210.3 respectively. The pin pair VPORTP_3 and VPORTN_3 may be referred to as PORT3. Likewise, PD 106.2 through PD 106.0 attach to a corresponding pin VPORTP and VPORTN via a corresponding center tap 214 and a corresponding center tap 210 respectively. In a similar manner as PORT3, the pin pairs VPORTP_2 through VPORTP_0 and VPORTN_2 through VPORTN_0 for a corresponding PD 106.2 through 106.0 may also be referred to as corresponding port PORT2 through PORT0.

Figure 3B:
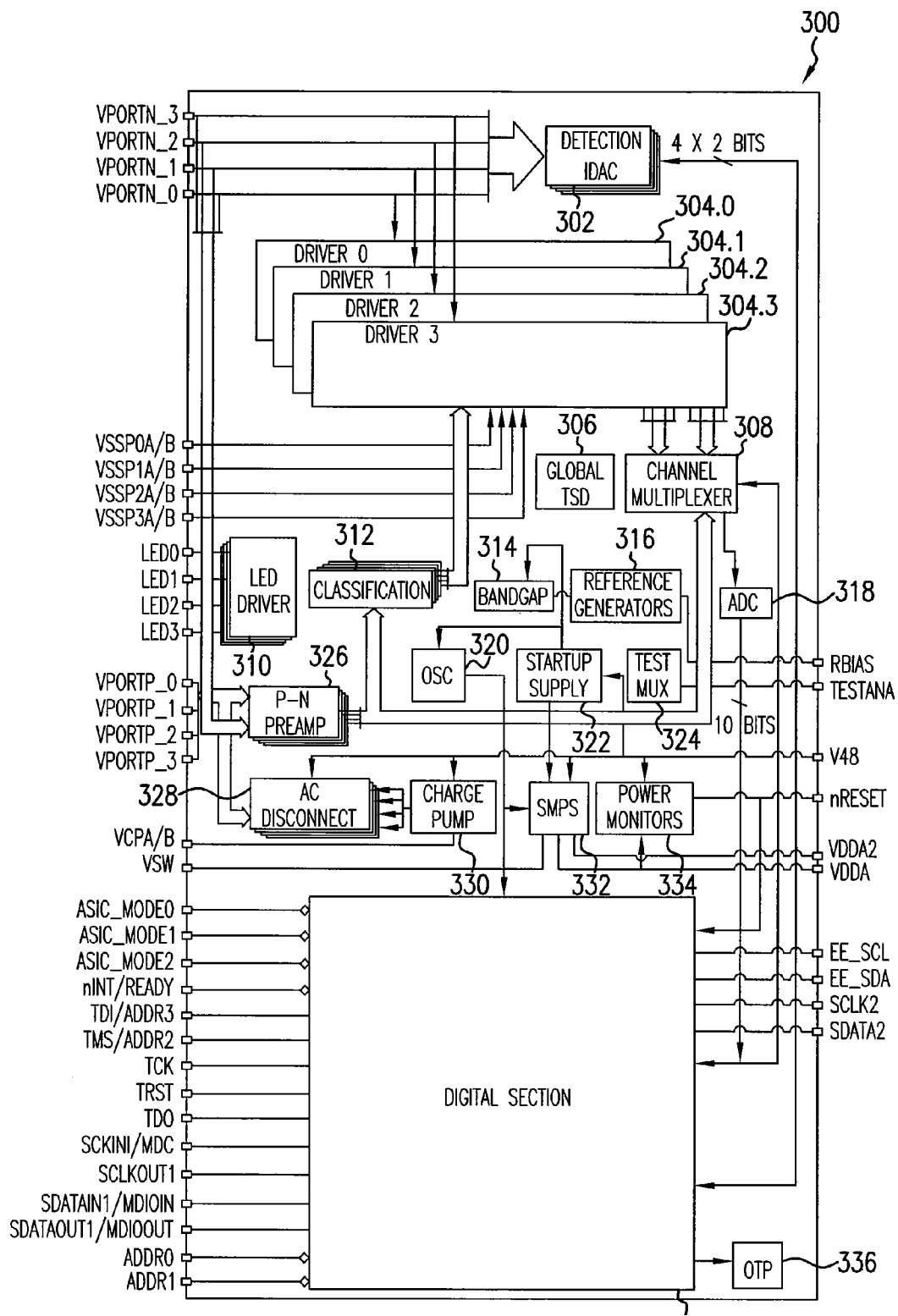
FIG. 3B is a more detailed illustration of a block diagram of a Power Source Equipment (PSE) controller according to an embodiment of the present invention.

FIG. 3B is a more detailed illustration of a block diagram of a Power Source Equipment (PSE) controller according to an embodiment of the present invention. The main functions of the PSE controller 300 are to search the link section for a PD, optionally classify the PD, supply power to the link section (only if a PD is detected), monitor the power on the link section, and scale power back to the detect level when power is longer requested or required.

In an exemplary embodiment, the PSE controller 300 may provide power via one of two valid four-wire connections. In each four-wire connection, the two conductors associated with a pair each carry the same nominal current in both magnitude and polarity. In a MDI-X connection, conductors 1 and 2 correspond to the negative port voltage, denoted as VPORTN, while conductors 3 and 6 correspond to the positive port voltage, denoted as VPORTP. On the other hand, for a MDI connection, conductors 1 and 2 correspond to VPORTP, while conductors 3 and 6 correspond to the VPORTN. The MDI-X connection and the MDI connection are referred to as an Alternative A configuration. For an Alternative B connection, conductors 4 and 5 correspond to VPORTP, while conductors 7 and 8 correspond to the VPORTN.

In an operational mode, the PSE controller 300 may not apply operating power to the power interface until the PSE controller 300 has successfully detected a PD requesting power. The PSE controller 300 turns on power after a valid detection otherwise the PSE controller 300 initiates and successfully complete a new detection cycle before applying power. In an exemplary embodiment, the PSE controller 300 turns on power after a valid detection in less than 400 ms, if power is to be applied, otherwise, if the PSE controller 300 cannot supply power within a maximum of 400 ms, it shall initiate and successfully complete a new detection cycle before applying power. More specifically, before the PSE controller 300 supplies power to a PD, a detection function measures the loading of a requesting PD. The detection function measures whether the PD has a correct signature resistance and a correct signature capacitance by applying current levels from a corresponding detection current detection digital to analog converter (detection IDAC) 302 into the PD. In an exemplary embodiment, the PD has a correct signature resistance from 19 kΩ to 26.5 kΩ and a correct signature capacitance less than 150 nF.

Figure 4A:
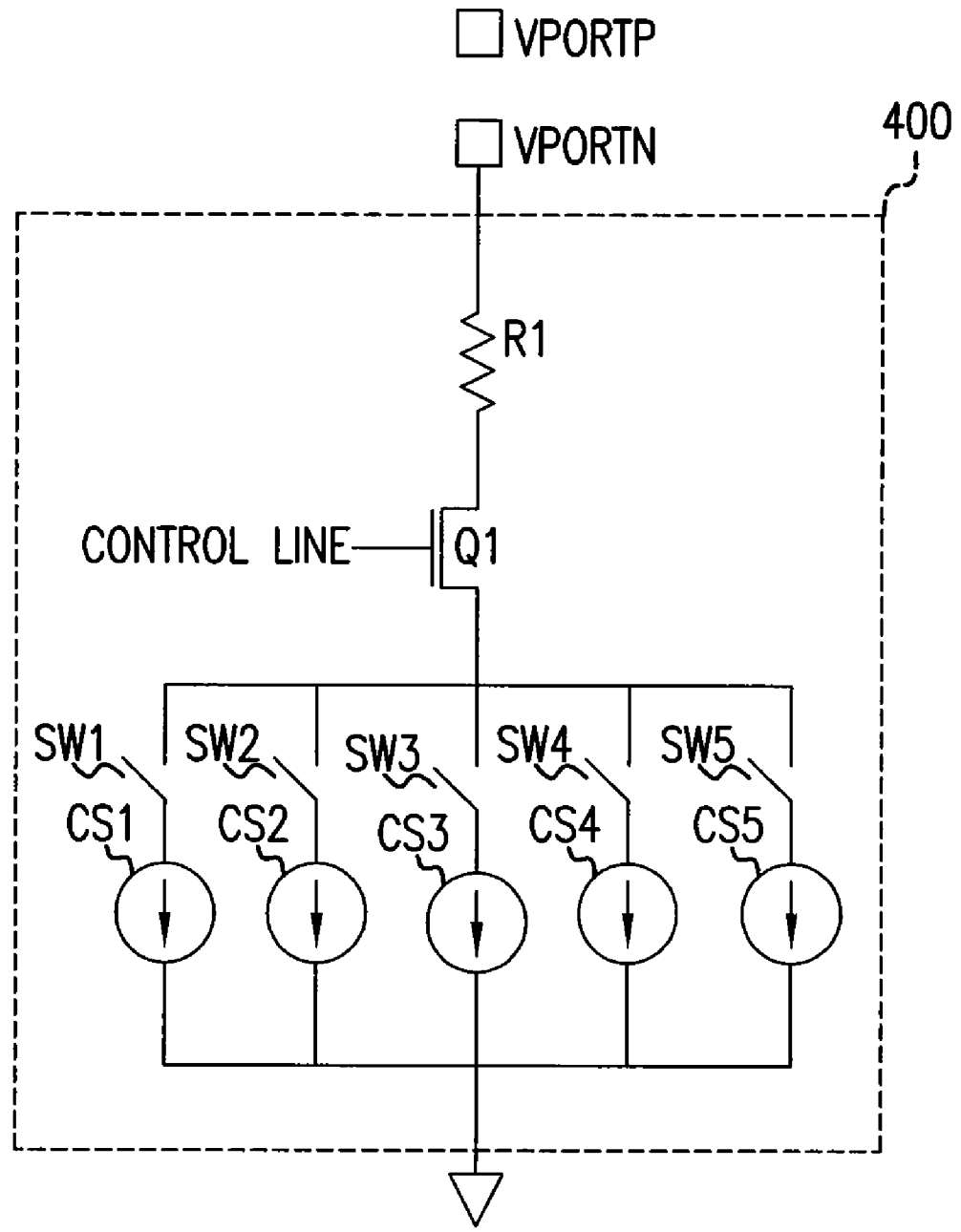
FIG. 4A is an illustration of a block diagram of current detection digital to analog converter (detection IDAC) according to an embodiment of the present invention.

FIG. 4A is an illustration of a block diagram of current detection digital to analog converter (detection IDAC) 400 according to an embodiment of the present invention. A corresponding detection IDAC 302.0 through 302.3 forces certain current levels into the PD by applying a current to a corresponding pin VPORTN[3:0]. Each one of the IDACs in IDAC 302.0 through IDAC 302.3 as shown in FIG. 3 may be implemented using the IDAC 400.

Referring to FIG. 4A, a PD requesting power is attached to VPORTP and VPORTN. VPORTN is connected to a drain of DMOS transistor through a resistor R1. In an exemplary embodiment, resistor R1 has a value of 15 kΩ. A gate of the transistor Q1 is connected to a control line from a suitable control source such as a microprocessor to provide an example. The control line activates the transistor Q1 forcing current onto VPORTN. A source of transistor Q1 is connected to one end of a parallel switch bank formed by switches SW1 through SW5. A two bit control line (not shown) from the digital section 338 controls the switches SW1 through SW5. The digital section 338 is further described below in FIG. 10. The switches SW1 through SW5 further connect to a corresponding current source CS1 through CS5. In a further exemplary embodiment, the current source CS1 sources 170 µA, the current sources CS2 through CS4 each source 30 µA, and the current source CS5 sources 10 µA.

During operation, when the two-bit control line activates a corresponding switch SW1 through SW5, the corresponding current source CS1 through CS5 coupled to the activated switch contributes to the current applied to VPORTN. For example, if the two-bit control line activates SW1 only, then the current as seen at VPORTN is the magnitude of CS1 only. Likewise, if the two-bit control line activates SW1 and SW2, then the current as seen at VPORTN is combination of CS1 and CS2. After applying a specific current level from a corresponding detection IDAC 302.0 through IDAC 302.3 into the PD, the detection function then measures the resulting voltage to distinguish between a valid powered device signature, an invalid device signature, an open load, a short circuit, and a high voltage to provide some examples. The detection function may use a 2-point detection, a 4-point detection, or a legacy detection to measure the resulting voltage.

Figure 4B:
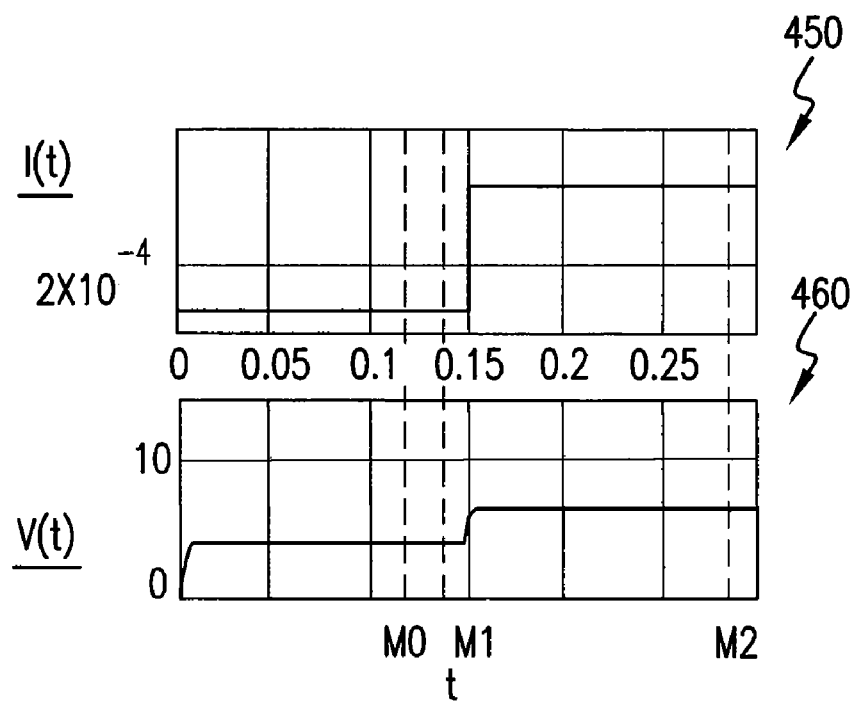
FIG. 4B shows an exemplary representation of the voltage measured by the detection function to distinguish between a valid powered device signature, an invalid device signature, an open load, a short circuit, and a high voltage according to an embodiment of the present invention.

In accordance with the IEEE standard 802.3af, the detection function uses the 2-point detection, the 4-point detection, or the legacy detection to make measurements with a detection voltage ranging from 2.8V to 10V. FIG. 4B illustrates an exemplary illustration of a 2-point detection function to determine a powered device signature according to an exemplary embodiment of the present invention. The 2-point detection function makes three measurements with a detection voltage ranging from 2.8V to 10V to create a minimum of a one-volt difference between adjacent measurements with a valid PD detection signature connected.

FIG. 4B shows an exemplary representation 450 of the current applied to the PD by a corresponding IDAC 302.0 through 302.3 as discussed in FIG. 4A and an exemplary representation 460 of the voltage measured by the detection function to distinguish between a valid powered device signature, an invalid device signature, an open load, a short circuit, and a high voltage to provide some examples. In an exemplary embodiment, the current applied to VPORTN to measure point M0 and M1 is 170 µA while the current to measure point M2 is 260 µA. More specifically, the detection function measures the resulting voltage of three points, denoted M0, M1, and M2 to determine the signature resistance and the signature capacitance of the requesting PD.

As shown in FIG. 4B, the 2-point detection function measures M0 at time when the current applied to the VPORTN is at a first value. After settling of the measured voltage that typically occurs after 36 ms, the detection function measures M1 before the current applied to the VPORTN changes from its first value to a second value. Settling of the measured voltage may be guaranteed if the difference between M1 and M0 is within 0.1875V. After the current applied to the VPORTN increases to its second value, the detection function measures M2. The difference between M2 and M1 corresponds to the value of the signature resistance and the signature capacitance.

Figure 4C:
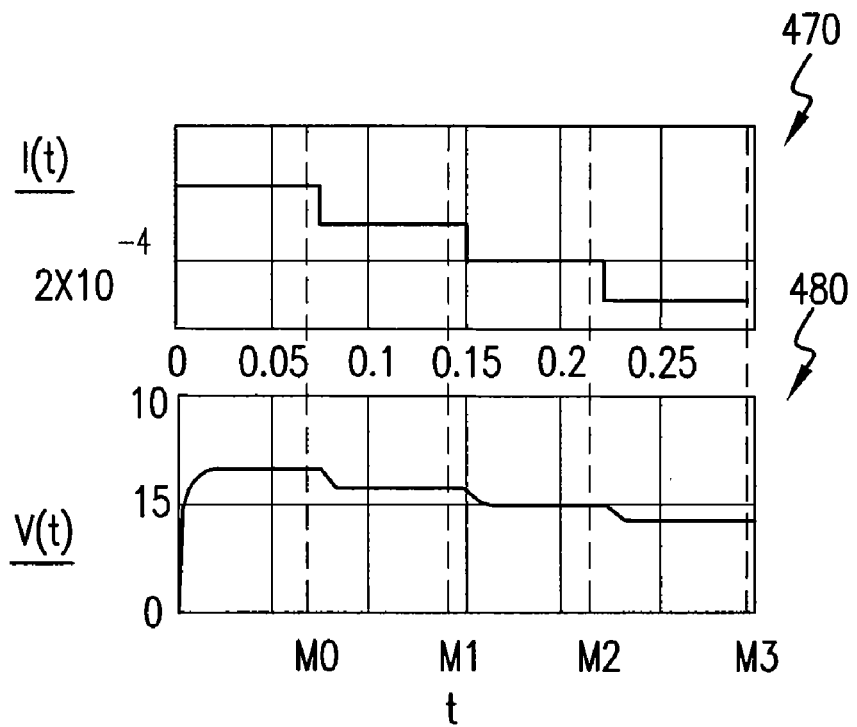
FIG. 4C shows an exemplary representation of the voltage measured by the detection function to distinguish between a valid powered device signature, an invalid device signature, an open load, a short circuit, and a high voltage according to another embodiment of the present invention.

FIG. 4C shows an exemplary representation 460 of the current applied to the PD by a corresponding IDAC 302.0 through 302.3 as discussed in FIG. 4A and an exemplary representation 470 of the voltage measured by the detection function to distinguish between a valid powered device signature, an invalid device signature, an open load, a short circuit, and a high voltage to provide some examples. In an exemplary embodiment, the current applied to VPORTN to measure point M3 is 170 µA, to measure point M2 is 200 µA, to measure point M1 is 230 µA and to measure point M0 is 260 µA. More specifically, the detection function measures the resulting voltage of four points, denoted M0, M1, M2, and M3 to determine the signature resistance and the signature capacitance of the requesting PD.

As shown in FIG. 4C, the 4-point detection function measures M0 at time when the current applied to the VPORTN is at a first value. After the current applied to the VPORTN decreases to a second value, the detection function measures M1. After the current applied to the VPORTN decreases to a third value, the detection function measures M2. After the current applied to the VPORTN decreases to a fourth value, the detection function measures M3. After measuring of the four points M0 through M3, the detection function calculates a difference or delta between alternate points. For example, the detection function calculates the delta, deltaV0, between the voltage as measured at point M0 and the voltage as measured M2 and another delta, deltaV1, between the voltage as measured at point M1 and the voltage as measured M3. The difference between deltaV1 and deltaV0 corresponds to the value of the signature resistance and the signature capacitance. Further description of the 4-point detection function is given in U.S. patent application Ser. No. 11/653,956, entitled "Apparatus and Method for Multi-Point Detection in Power-Over-Ethernet Detection Mode" filed on Jan. 17, 2007, which is incorporated by reference in its entirety.

In the absence of a signature resistance, the detection function may use the legacy detection for PD devices containing only a signature capacitance. In certain legacy PD devices, the signature provided to the PSE controller 300 is purely capacitive preventing detection of a valid powered device signature using either the 2-point detection function or the 4-point detection function. The PSE controller 300 measures the signature capacitance by applying a fixed current source and measuring the slewrate of the port voltage, $V_{PORT}$. The legacy detection is implemented to extract a legacy PD port capacitor by sourcing a fixed current $I_{LEGACY}$ from the VPORTN pin then measure the slew-rate of the voltage across VPORTN and VPORTP, to extract the PD capacitor. Enabling of the legacy detection function, activates a current source $I_{LEGACY}$. The current source $I_{LEGACY}$ charges the capacitor of the legacy PD. Based on the n*18 ms or n*1.152 ms conversion time of calibrated samples the capacitor value can be extracted out of the port voltage, measurement by the formula:

$$C_{PD} = I_{LEGACY} * (\Delta t / \Delta V_{PORT}), \quad (1)$$

where $C_{PD}$ represents the capacitive load, $I_{LEGACY}$ represents the fixed current source $I_{LEGACY}$, $\Delta t$ represents the time between adjacent samples, and $\Delta V_{PORT}$ represents the change in port voltage.

In addition to detecting a valid powered device signature, the PSE controller 300 must differentiate between an open load condition and an invalid resistance. The open circuit detection function runs in background in conjunction with either the 2-point detection function or the 4-point detection function. If any of the measured points, M0 through M2 for the 2-point detection function or M0 through M3 for the 4-point detection function reaches 10V, the detection process terminates activating an open load process. During the open load process, the detection function activates the current source CS5 as shown in FIG. 4A. After 18 ms, the open load detection function re-measures the corresponding point that reached 10V. If after 18 ms, the measured voltage is still greater than 10V, the load is considered open (>500 kohm). In a similar manner, the detection function may detect a short circuit condition if the samples M0 through M2 as shown in FIG. 4B for the 2-point detection or if the samples M0 through M3 as shown in FIG. 4C for the 4-point detection are below 1V. Likewise, the PSE controller 300 may detect a high voltage condition if the samples M0 through M2 as shown in FIG. 4B for the 2-point detection or if the samples M0 through M3 as shown in FIG. 4C for the 4-point detection are above 10V. Additionally the PSE controller 300 may detect a high voltage condition upon starting the open load detection process, and the measured voltage drops below typical 10V during the open load detection process.

After measuring the voltage using the detection functions as described above, the signature resistance as well as the signature capacitance of the PD may be determined. The PSE controller 300 determines a valid powered device signature according to the signature resistance and the parallel signature capacitance. In accordance with the IEEE standard 802.3af, the valid powered device signature has a signature resistance in the range of 19 kΩ to 26.5 kΩ, and a maximum parallel signature capacitance of 150 nF. On the other hand, an invalid device signature has a signature resistance less than equal to 15 kΩ, signature resistance greater than or equal to 33 kΩ, and/or signature capacitance greater than or equal to 10 μF. In addition, a signature resistance from 15 kΩ to 19 kΩ and from 26.5 kΩ to 33 kΩ may be regarded as either the valid powered device signature or the invalid device signature. In an exemplary embodiment, the PSE controller accepts the signature resistance in between 15 kΩ and 19 kΩ and between 26.5 kΩ and 33 kΩ thereby extending the correct signature resistance from 15 kΩ to 33 kΩ.

After determining a valid powered device signature using the detection function, the PSE may optionally classify a PD to allow features such as load management to provide an example to be implemented. If a PSE successfully completes detection of a PD, and the PSE does not classify the PD in Class 1, 2, 3, or 4, then the PSE shall assign the PD to Class 0. A successful classification of a PD requires the successful PD detection, and subsequently, successful class 0-4 classification. A PSE may remove power to a PD that violates the maximum power required for its advertised class. A PSE performs optional classification of a PD by applying voltage and measuring current. The PSE classification circuit has adequate stability to prevent oscillation when connected to a PD.

Figure 5:
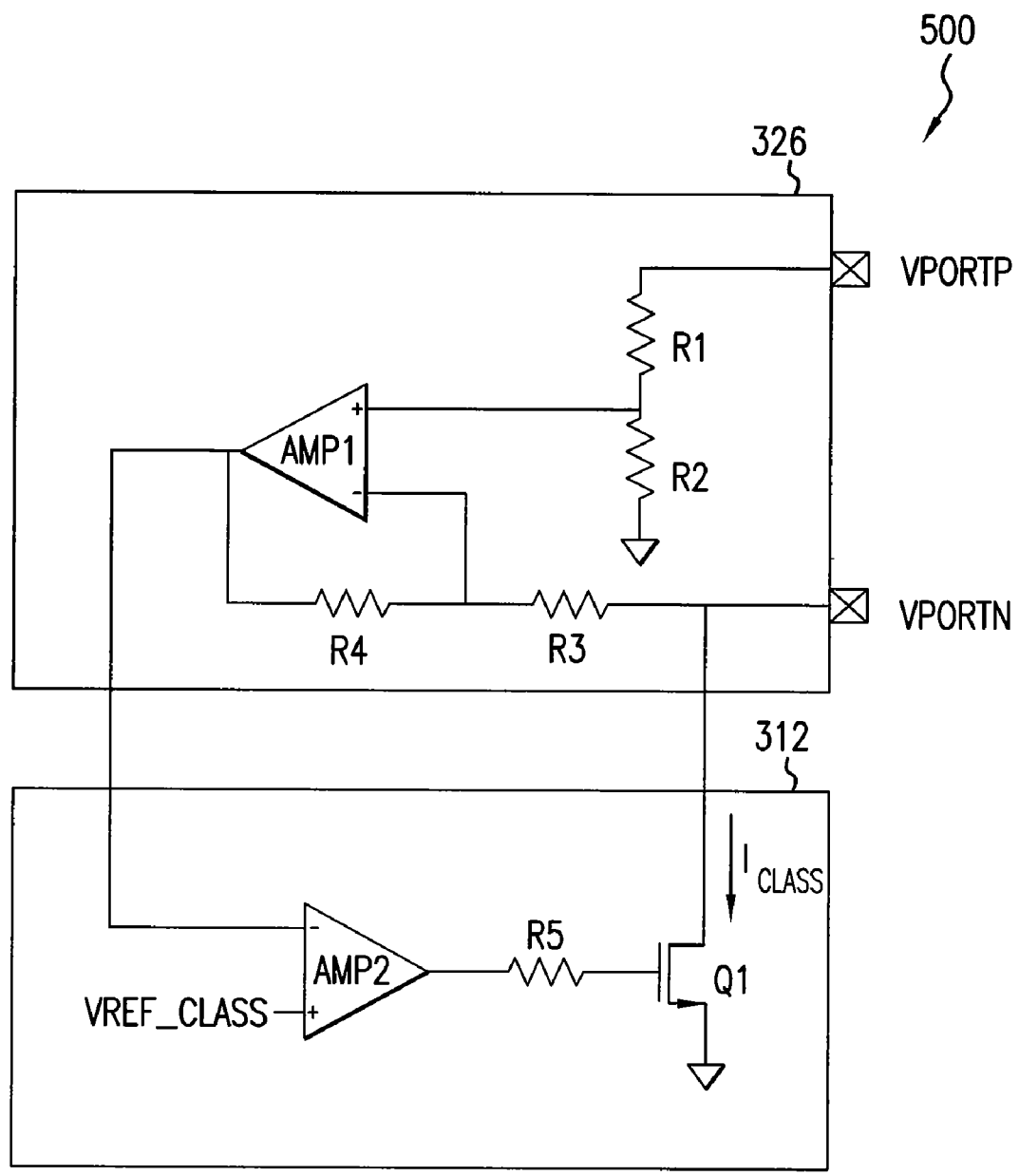
FIG. 5 is an illustration of a block diagram of a classification circuit according to an embodiment of the present invention.

FIG. 5 is an illustration of a block diagram of a classification circuit according to an embodiment of the present invention. A PD attached to VPORTP and VPORTN provides information in the form of a power classification signature that allows the PSE to classify its power requirements. The PSE controller 300 determines the power classification signature by measuring the classification current, denoted as $I_{CLASS}$, for a given classification reference voltage, denoted as VREF_CLASS.

The classification circuit 500 applies a voltage of approximately 15.5V to 20.5V across a PD attached to VPORTP and VPORTN. A preamplifier 326 converts the voltage across VPORTP and VPORTN from a differential waveform to a single ended waveform. More specifically, the preamplifier 326 includes an operational amplifier, AMP1, along with resistors R1 through R4. In an exemplary embodiment, the combination of resistor R1 with resistor R2 is 6 MegaOhms (MΩ) and the combination of the resistor R3 and the resistor R4 is also 6 MΩ. For example, if R1 is 5 MΩ, then R2 is 1 MΩ. In another exemplary embodiment, resistors R1 through R4 are implemented using Poly as referred to as "Hi-Po" with a sheet Rho of 1 kohm/square. The combination of resistor R1 with resistor R2 is equivalent to the combination of resistor R3 with resistor R4 thereby setting the gain of the operational amplifier AMP1 to approximately one.

The classification module 312 compares the output of the preamplifier 326 to the classification reference voltage VREF_CLASS to provide the classification current $I_{CLASS}$. More specifically, the classification module 312 compares the single ended output of the preamplifier 326 to the classification reference voltage VREF_CLASS using a comparator, denoted as AMP2. The output of the comparator AMP2 represents the difference in voltage between the single ended output of the preamplifier 326 and the classification reference voltage VREF_CLASS. An optional low resistance resistor R5 is placed in series with the output of the comparator AMP2 to provide electro-static discharge (ESD) protection. In a further exemplary embodiment, the resistor R5 has a value of 600Ω.

A main driver switch Q1 generates the classification current $I_{CLASS}$ based upon the difference in voltage between the single ended output of the preamplifier 326 and the classification reference voltage VREF_CLASS. More specifically, the output of the comparator AMP2 drives a gate of the main driver switch Q1. When the output of the comparator AMP2 is greater than a threshold voltage of the main driver switch Q1, the main driver switch Q1 activates thereby generating the classification current $I_{CLASS}$. The magnitude of the classification current $I_{CLASS}$ therefore depends in part on the output of the comparator AMP2.

The PSE controller measures the classification current $I_{CLASS}$ and classifies the PD based upon the measured classification current $I_{CLASS}$. In accordance with the IEEE Standard 802.3af, PSE controller 300 classifies the PD as follows:

| Measured $I_{CLASS}$ | Classification |
| --- | --- |
| 0 mA to 5 mA | Class 0 |
| >5 mA and <8 mA | May be Class 0 or 1 |
| 8 mA to 13 mA | Class 1 |
| >13 mA and <16 mA | May be Class 0, 1, or 2 |
| 16 mA to 21 mA | Class 2 |
| >21 ma and <25 mA | May be Class 0, 2, or 3 |
| 25 mA to 31 mA | Class 3 |
| >31 mA and <35 mA | May be Class 0, 3, or 4 |
| 35 mA to 45 mA | Class 4 |
| >45 mA and <51 mA | May be Class 0 or 4 |

The PSE controller 300 may operate in one of three different operating modes. In the detection mode, the PSE controller 300 continuously measures the voltage of each port. On the other hand, in the classification mode, the PSE controller 300 continuously measures the current of each port. Finally, in the powered mode, the PSE controller 300 continuously measures the current, the voltage, and the temperature of each port. More specifically, after a successful detection and an optional classification of a PD, the PSE controller 300 begins to operate in a powered mode by applying power to drivers 304.0 through 304.3. The voltage, the current, and the temperature of the port drivers are continuously measured using the measurement systems as discussed in FIG. 6A through FIG. 6D.

Figure 6A:
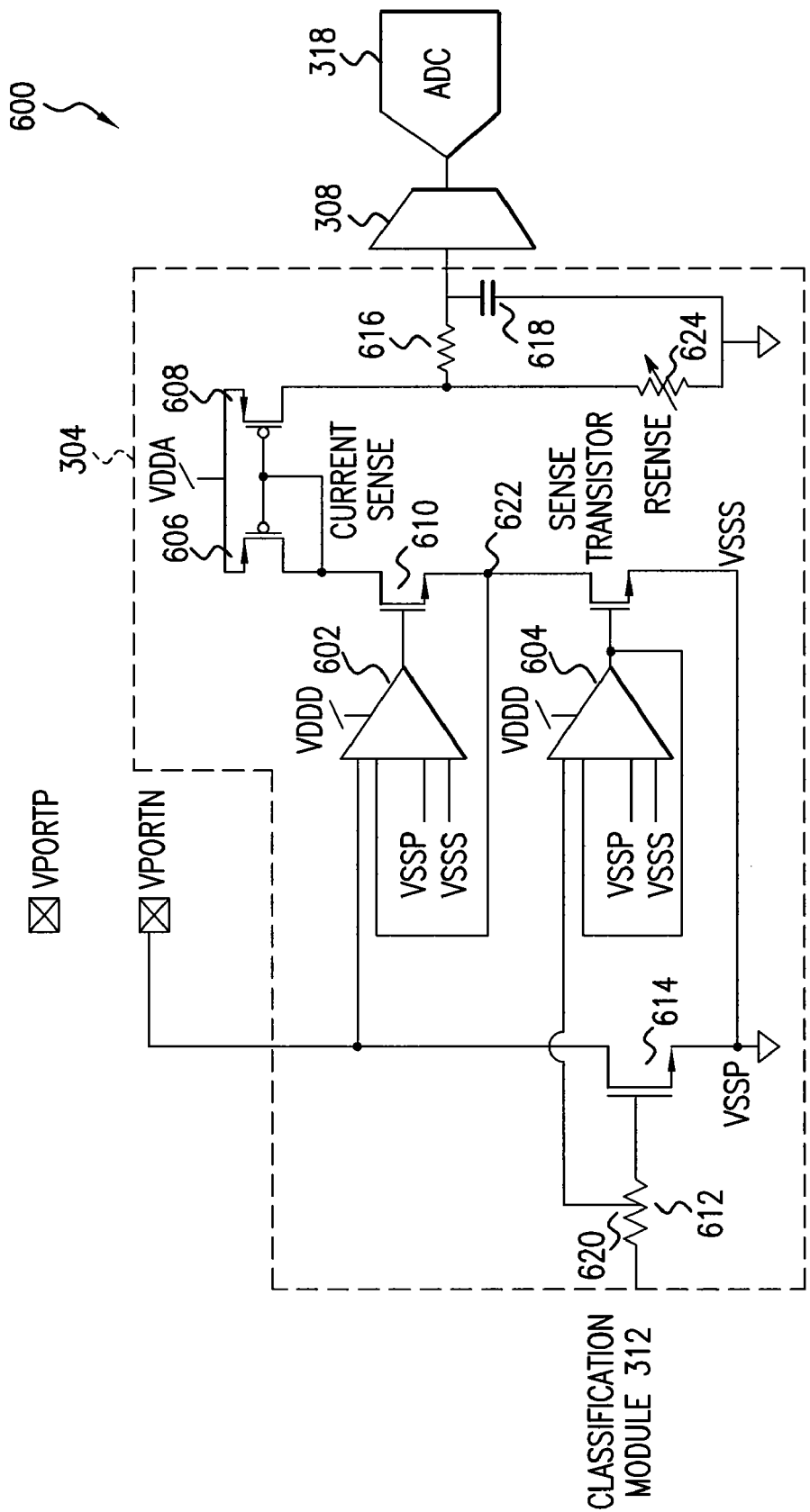
FIG. 6A is an illustration of a block diagram of a current measurement system according to an embodiment of the present invention.

FIG. 6A is an illustration of a block diagram of a current measurement system according to an embodiment of the present invention. The current measurement system 600 of the present invention may be implemented as part of the drivers 304.0 through 304.3 as shown in FIG. 3. Conventional techniques for measuring the current of the port drivers require measuring the voltage dissipated by a parallel resistor connected between a drain and a source of a large transistor. The size of the transistor must be large to safety handle the voltage and the current draw from the PD. As a result, a small value is chosen for the parallel resistor to conserve power. The small value of the parallel resistor reduces the ability to accurately measure the series resistor thereby diminishing the accuracy of the current measurement system. Instead of measuring the current in the actual device, the current measurement system 600 uses a resistorless current sensor or resistorless switch approach. The resistorless switch approach measures a replica current generated by a sense transistor and a current mirror.

As shown in FIG. 6A, the output of the classification module 312 connects to a tapped resistive network 612. The output of the classification module 312 is a current from 0 mA to 51 mA corresponding to the classification of the PD. A first portion of the tapped resistive network 612 connects to a gate of a main transistor 614, while an input of a gate buffer amplifier 604 connects between the first portion and a second portion of the tapped resistive network 612, denoted as 620. A drain of the main transistor 614 connects to pin VPORTN while a source of the transistor 614 connects to a potential VSSP.

The current measurement system 600 biases the sense transistor in a similar manner as the main transistor 614 using a gate buffer amplifier 604 and a drain buffer amplifier 602. More specifically, the gate buffer amplifier 604 replicates the gate to source biasing of the main transistor 614. The gate to source voltage of the main transistor 614 corresponds to the voltage difference between 620 and a potential VSSP. Likewise, the gate to source voltage of the sense transistor corresponds to the voltage difference between the output of the gate buffer amplifier 604 and the potential VSSS. The gate buffer amplifier 604 first compares the gate to source voltage of the main transistor 614 with the gate to source voltage of the sense transistor then the gate buffer amplifier 604 adjusts its output to replicate the gate to source biasing of the main transistor 414. As a result, the gate of the sense transistor is biased in a similar manner as the gate of the main transistor 614.

Similarly, the drain buffer amplifier 602 replicates the drain to source biasing of the main transistor 614. The drain to source voltage of the main transistor 614 corresponds to the difference in voltage VPORTN and the potential VSSP. Likewise, the drain to source voltage of the sense transistor corresponds to the difference between the voltage at 622 and the potential VSSS. The drain buffer amplifier 604 first compares the drain to source voltage of the main transistor 614 with the drain to source voltage of the sense transistor then adjusts the current in the transistor 610 based upon the results of the comparison to replicate the drain to source biasing of the main transistor 614. In other words, the drain buffer amplifier 604 switches the transistor 610 to allow current from a current mirror formed by a transistor 606 and a transistor 608 to flow to the sense transistor.

The current minor formed by a transistor 606 and a transistor 608 sources current to the sense transistor via the transistor 610. By making the size of the sense transistor smaller than the size of the main transistor 614, a proportional amount of current flows through the main transistor 614 as compared to the sense transistor. The current measurement system 600 conserves power by measuring the amount of current in the sense transistor. A replica of the current in sense transistor flows through transistor 608 to resistor RSENSE 624. The current measurement system 600 measures the current in transistor 608 as dissipated by the resistor RSENSE 624.

In an exemplary embodiment, the current measurement system 600 also contains an optional low pass filter formed by resistor 616 and capacitor 618 allowing for a bandwidth of approximately 375 kHz. The dissipation of the resistor RSENSE 624 by the replica of the current in transistor 614 converts the replica current to a sense voltage. The sense voltage enters the multiplexer 308 followed by the ADC 318. In another exemplary embodiment, the optional low pass filter may be implemented as part of either the multiplexer 308 or the ADC 318.

Figure 6B:
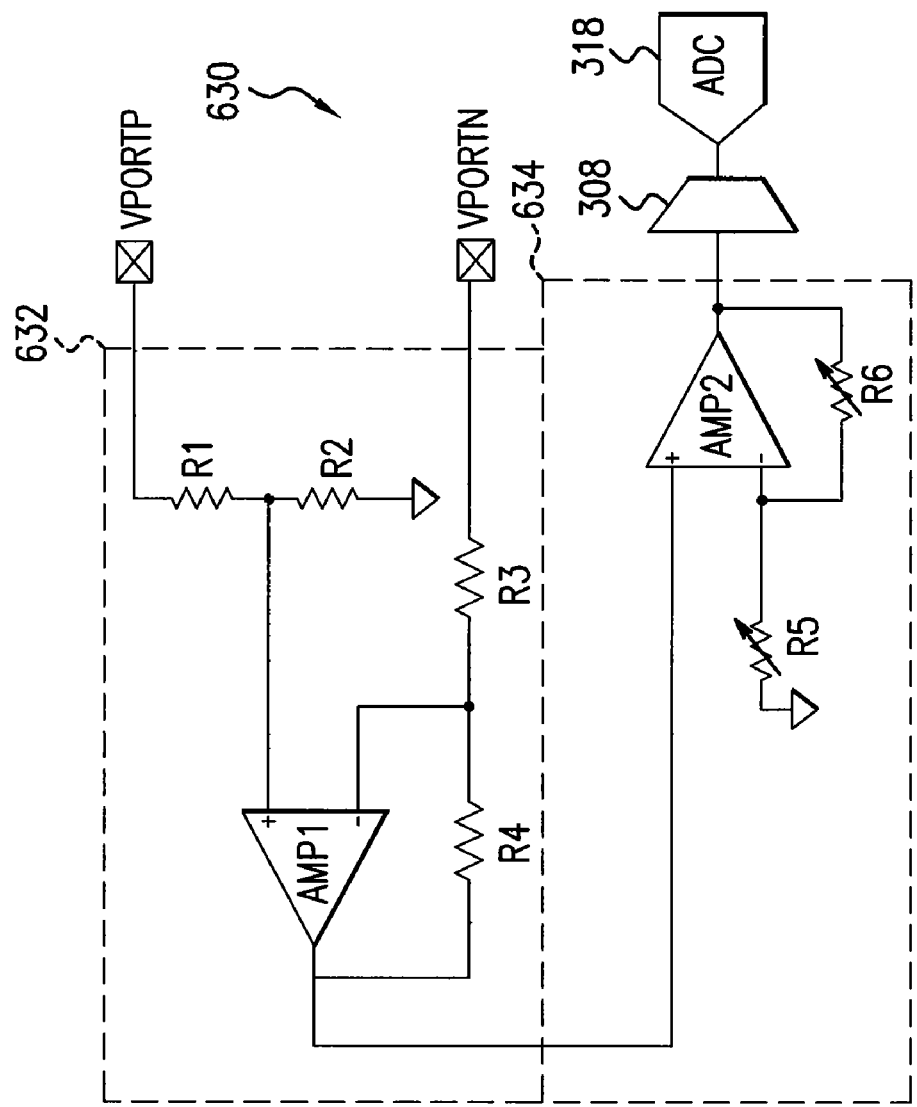
FIG. 6B is an illustration of a block diagram of a voltage measurement system according to an embodiment of the present invention.

FIG. 6B is an illustration of a block diagram of a voltage measurement system according to an embodiment of the present invention. A voltage measurement system 630 may be implemented with the preamplifier 326 along with the classification module 312 as discussed in FIG. 5. More specifically, the voltage measurement system 630 and the classification module 312 may be implemented within the preamplifier 326 and may either share common components such as AMP1 to provide an example or may be implemented completely separate from each either.

The voltage measurement system 630 measures the voltage of a PD attached to VPORTP and VPORTN. For this alternative exemplary embodiment, the preamplifier 326 includes an operational amplifier, AMP1, along with resistors R1 through R4. In an exemplary embodiment, the combination of resistor R1 with resistor R2 is 6 MegaOhms (MΩ) and the combination of the resistor R3 and the resistor R4 is also 6 MΩ. For example, if R1 is 5 MΩ, then R2 is 1 MΩ. In another exemplary embodiment, resistors R1 through R4 are implemented using Poly as referred to as "Hi-Po" with a sheet Rho of 1 kohm/square. The combination of resistor R1 with resistor R2 is equivalent to the combination of resistor R3 with resistor R4 thereby setting the gain of the operational amplifier AMP1 to approximately one. A voltage measurement module 634 uses a buffer amplifier AMP2 to connect the output of the operational amplifier AMP1 to the ADC 318 via the multiplexer 308. The ratio of resistor R5 to resistor R6 determines the gain of the buffer amplifier AMP2. In an exemplary embodiment, the gain of the buffer amplifier AMP2 is set to 1 in the power-mode and to 5.625 in the detection-mode.

Figure 6C:
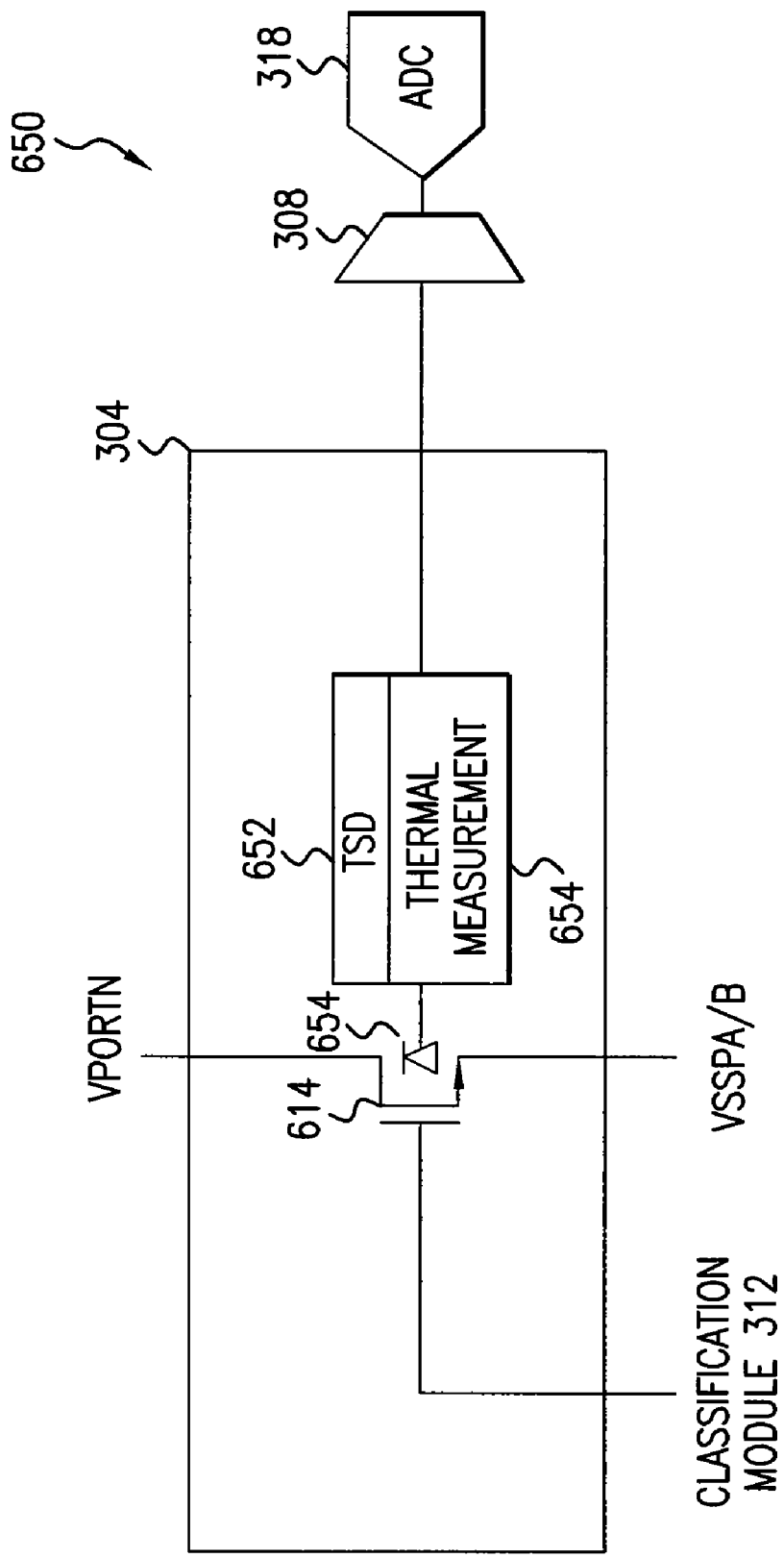
FIG. 6C is an illustration of a block diagram of a temperature measurement system according to an embodiment of the present invention.

FIG. 6C is an illustration of a block diagram of a temperature measurement system according to an embodiment of the present invention. The PSE controller 300 uses the temperature measurement system 650 to determine the temperature of each driver 304.0 through 304.3. The PSE controller may shut down power a corresponding driver 304.0 through 304.3 when the measured temperature exceeds a predetermined threshold.

The temperature measurement system 650 measures the temperature of the main transistor 614 used by the current measurement system 600. More specifically, the thermal measurement module 654 measures the temperature of a pn junction 656 of the main transistor 614. As previously discussed in FIG. 6A, the output of the classification module 312 activates the main transistor 614 allowing current to pass from a VPORTN to VSSPA/B. The temperature of the pn junction 656 increases or decreases based upon the amount of current in the main transistor 614. An output of the thermal measurement module 654 connects to the ADC 318 via the multiplexer 308. If the temperature exceeds a predetermined temperature, a thermal shutdown device (TSD) 652 removes power from the offending PD allowing other ports to continue operation even if local heating conditions are detected in other ports.

In addition to the port temperature shut down mechanism, the PSE controller 300 includes a global thermal shutdown (TSD) global TSD 306 to remove power from the PDs if the global temperature exceeds a predetermined temperature. More specifically, the TSD module 306 deactivates all the ports in the event the measured temperature exceeds a predetermined amount. The TSD module 306 is implemented in analog circuitry, therefore the temperature measurements from the temperature measurement system 650 are not used. If the average of the temperature samples from the measurement system and digital acquisition system 650 exceed as a predetermined temperature value of TSD, all the ports will be shut down and the PSE controller 300 will be reset.

Figure 6D:
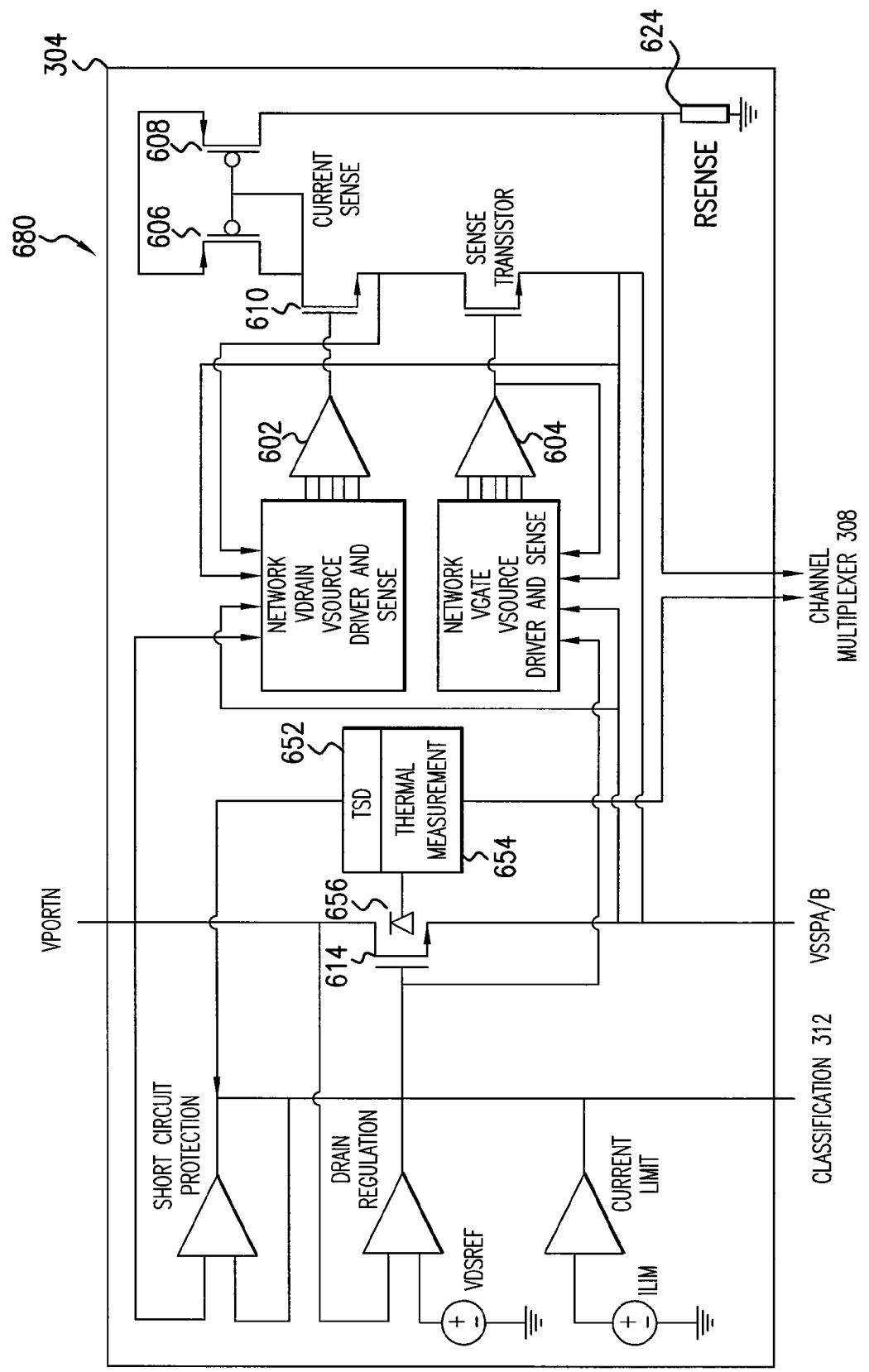
FIG. 6D is an illustration of a block diagram of a combination current and temperature measurement system according to an embodiment of the present invention.

FIG. 6D is an illustration of a block diagram of a combination current and temperature measurement system according to an embodiment of the present invention. The combination current and temperature measurement system 680 measures the current in similar manner as discussed previously in FIG. 6A and measures the temperature in similar manner as discussed previously in FIG. 6C. The combination current and temperature measurement system 680 includes additional circuitry to protect against short circuits, to regulate the voltage on the drain of the sense transistor, and to limit the current from the classification module 312.

Figure 7:
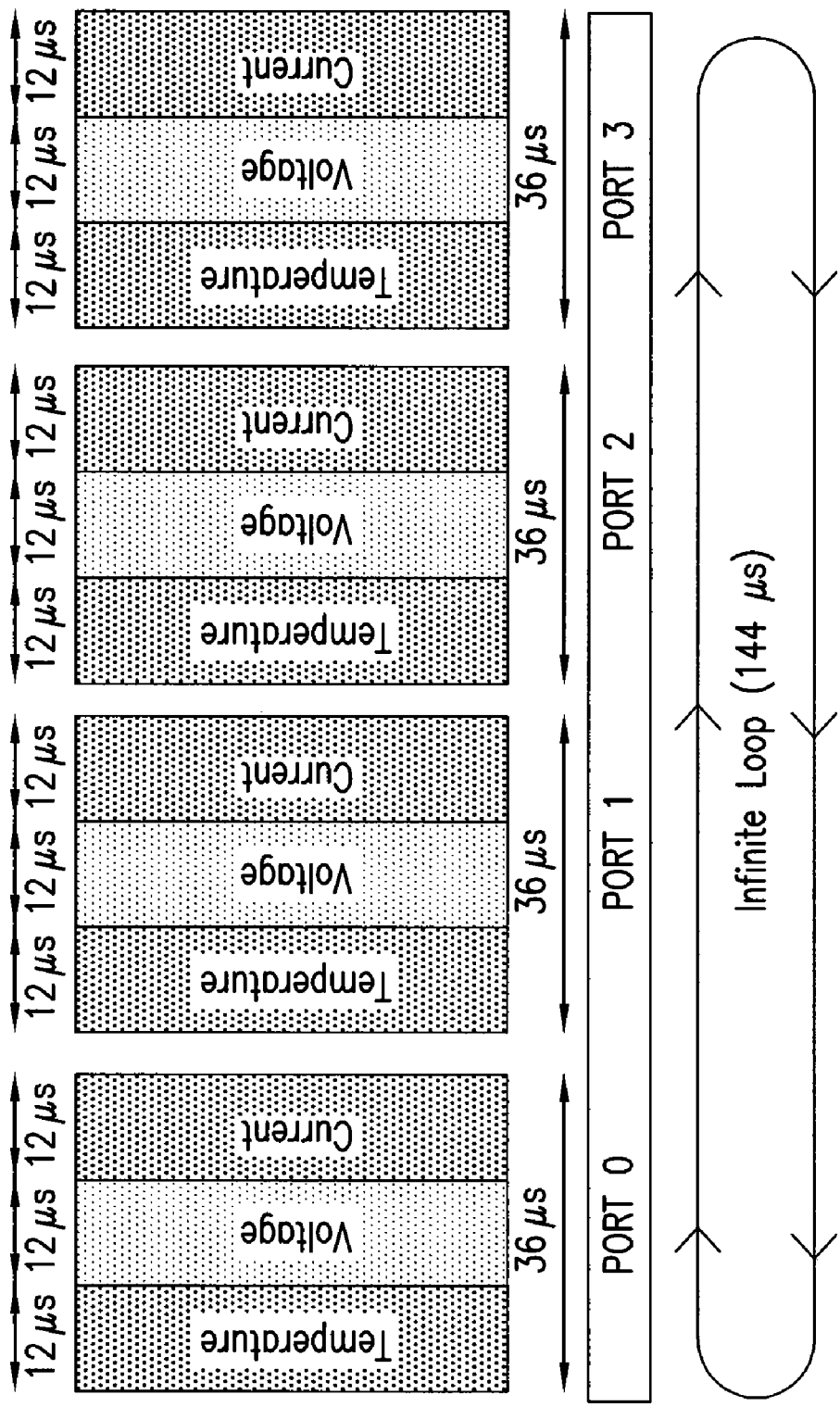
FIG. 7 is an illustration of a time division multiplexing scheme according to an embodiment of the present invention.

As shown in FIG. 6A through FIG. 6C, each measurement system connects to the multiplexer 308 and the ADC 318. The PSE controller 300 implements a time division multiplexing scheme whereby the corresponding outputs of the current measurement system 600, the voltage measurement system 630, and the temperature measurement system 650 are multiplexed into a single data stream then digitized by the ADC 318. The PSE controller 300 uses a single ADC 318 to digitize the output of the channel multiplexer 308. FIG. 7 is an illustration of a time division multiplexing scheme according to an embodiment of the present invention. The PSE controller 300 continuously measures the current, the voltage, and the temperature of each of the four ports when operating in the powered mode. The time division multiplexing scheme of the PSE controller allocates three channels, a first channel for the temperature measurement, a second channel for the voltage measurement, and a third channel for the current measurement, for each port for a total of twelve channels.

The time division multiplexing scheme allocates a time of $T_{MEASUREMENT}$ to measure the current, the voltage, and the temperature for each of the four ports. In an exemplary embodiment, time division multiplexing scheme allocates a time of 144 μs to measure the current, the voltage, and the temperature for each of the four ports. The time division multiplexing scheme allocates each port a time of $T_{PORT}$ to measure the current, the voltage, and the temperature. The time $T_{PORT}$ is the ratio of the total measurement time, $T_{MEASUREMENT}$, to the number of ports. For example, for a four-port system with a $T_{MEASUREMENT}$ of 144 μs, each port is allocated a time of 36 μs to measure the current, the voltage, and the temperature. The time division multiplexing scheme further allocates times of $T_{TEMP}$, $T_{VOLT}$, and $T_{CURR}$ to measure the current, the voltage, and the temperature. The combination of $T_{TEMP}$, $T_{VOLT}$, and $T_{CURR}$ is equivalent to $T_{PORT}$. The time division multiplexing scheme may allocate similar time intervals for $T_{TEMP}$, $T_{VOLT}$, and $T_{CURR}$ or dissimilar time intervals for $T_{TEMP}$, $T_{VOLT}$, and $T_{CURR}$ so long as the combination of $T_{TEMP}$, $T_{VOLT}$, and $T_{CURR}$ is equivalent to $T_{PORT}$. For example, as shown in FIG. 7, a four-port system with a $T_{MEASUREMENT}$ of 144 μs is divided into equal time intervals of 12 μs for $T_{TEMP}$, $T_{VOLT}$, and $T_{CURR}$. Each measurement of 12 μs is divided in two phases: a first phase to select the correct settings to the multiplexer such as the channel or port settings and to start the analog to digital conversion, and a second phase to wait for end of conversion and to capture the ADC results.

Figure 8A:
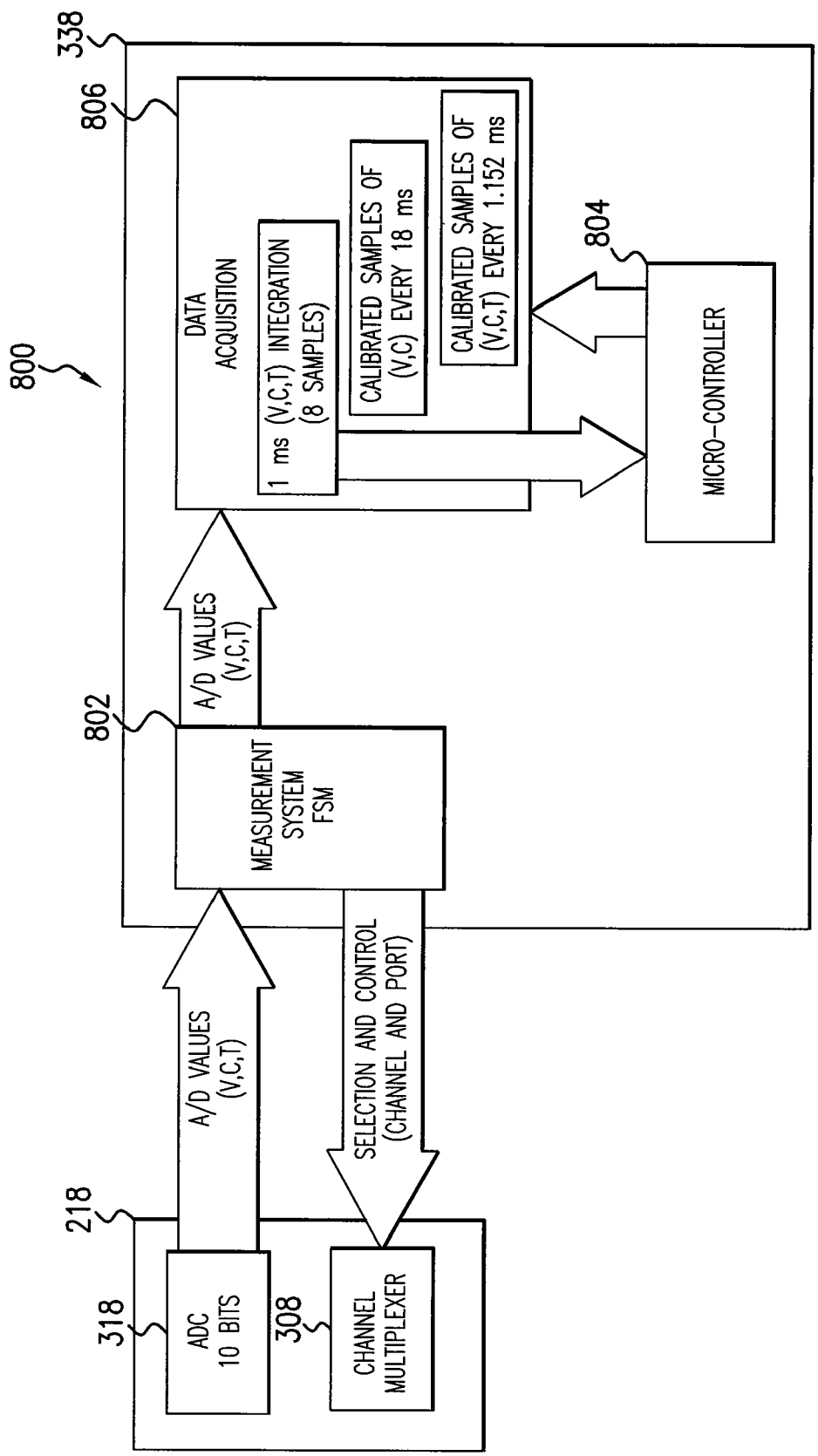
FIG. 8A is an illustration of a measurement system and digital acquisition system according to an embodiment of the present invention.

FIG. 8A is an illustration of a measurement system and digital acquisition system according to an embodiment of the present invention. During operation, the ADC 318 samples the current, the voltage, and the temperature measurements packaged according to the time division multiplexing scheme of FIG. 7. The samples from the ADC 318 are passed from a measurement system finite state machine (FSM) 802 to a data acquisition module 806. The measurement system FSM 802 provides the voltage, the temperature and the current samples directly from the ADC 318 once every 144 μs (128 samples in typical 18 ms). In other words, the measurement system FSM 802 stores the time division multiplexed measurements and provides the voltage, the temperature, and the current measurements for each port to the data acquisition module 806 once every 144 μs. The measurement system FSM 802 additionally provides the channel multiplexer 308 with control signals to enable the packaging of the voltage, the temperature, and the current measurements according to the time division multiplexing scheme of FIG. 7.

Figure 8B:
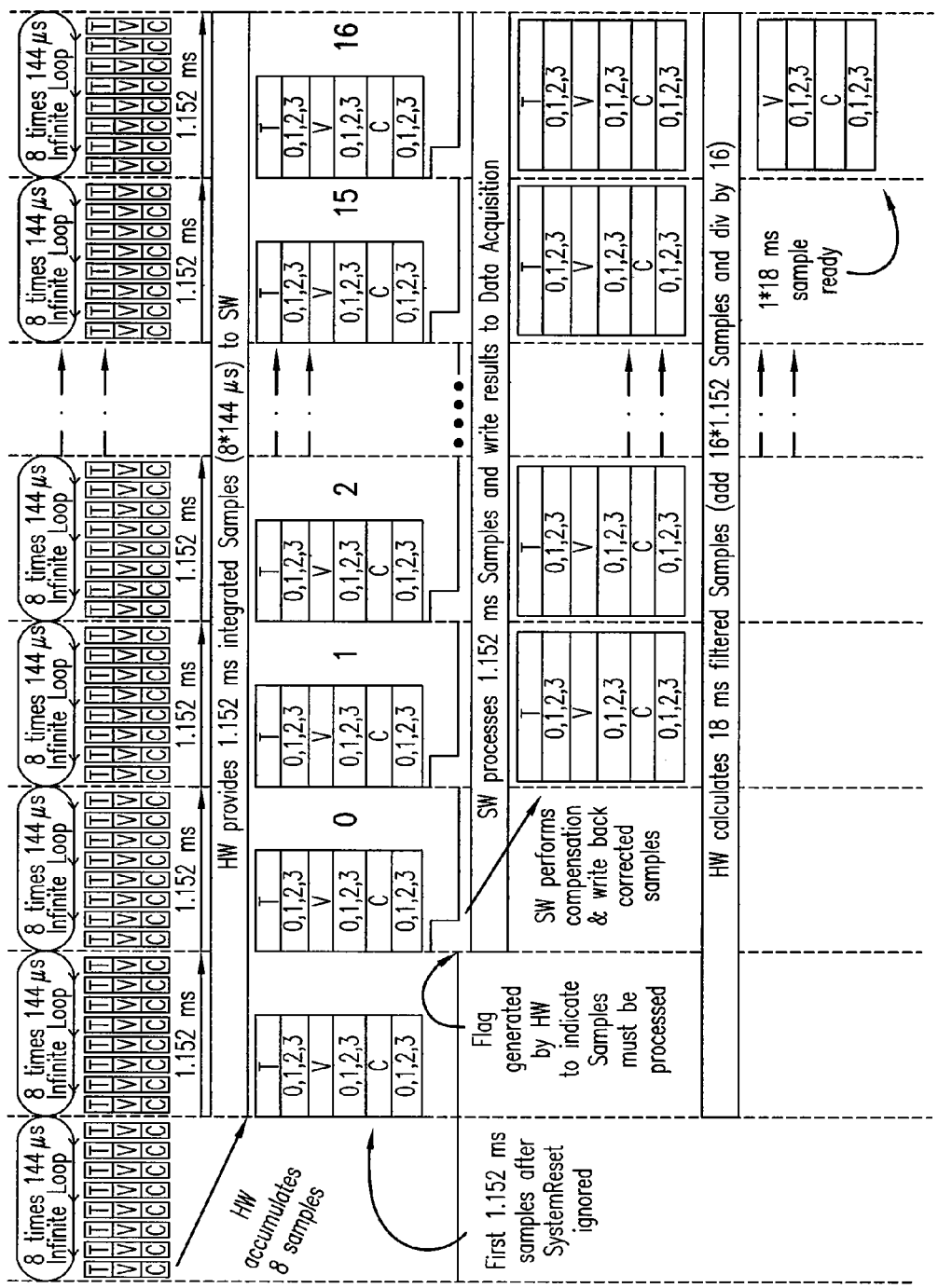
FIG. 8B is an illustration of a timing diagram of the measurement system and digital acquisition system according to an embodiment of the present invention.

FIG. 8B is an illustration of a timing diagram of the measurement system and digital acquisition system according to an embodiment of the present invention. The data acquisition module 806 stores eight voltage, temperature, and current measurements for each port provided by the measurement system FSM 802. In other words, the measurement system FSM 802 provides the data acquisition module 806 eight voltage, temperature, and current measurements for each port once every 144 μs for a total of 1.152 ms. A software routine within the data acquisition module 806 processes the eight voltage, temperature, and current measurements for each port then writes the results to a registers within the data acquisition module 806. More specifically, the software routine within the data acquisition module 806 integrates the eight voltage, temperature, and current measurements for each port.

The software routine within the data acquisition module 806 simultaneously provides the voltage, temperature, and current measurements for each port to a microcontroller 804. The microcontroller 804 proceeds with gain error and offset correction on the voltage, temperature, and current measurements. The measurement system and digital acquisition system 800 is digitally calibrated using One Time Programmable (OTP) coefficients from the OTP 336. To compensate the measurement system over temperature, offset and gain calibration coefficients are stored on the two final test temperature points. Interpolation between the calibration coefficients is based on the real time measured port temperature. The gain and offset coefficients used by the microcontroller 804 depends on the port number and its mode of operation. Some of the coefficients may be shared among different modes of operation. The offset and gain compensated voltage, temperature, and current measurements are then sent from the microcontroller 804 and stored in a register located within the data acquisition module 806 every 1.152 ms. The data acquisition module 806 integrates 16 of the 1.152 ms offset and gain compensated voltage, temperature, and current measurements in order to filter out or remove noise from 50 Hz to 60 Hz.

In addition to measuring the voltage, the current, and the temperature of the port drivers, the PSE controller 300 monitors for a Maintain Power Signature (MPS). The PSE controller removes power from the PD if the MPS condition is absent for longer than its related time limit. The MPS consists of two components: an AC MPS component and a DC MPS component. The PSE controller 300 may optionally monitor the AC MPS component only, the DC MPS component only or both the AC and the DC MPS components.

The DC MPS component is present if the DC current is greater than or equal to 10 mA for a minimum of 60 ms. Else, the DC MPS component may be either present or absent if the DC current is from 5 mA to 10 mA. Otherwise, the DC MPS component is absent when the PSE controller 300 detects a DC current from 0 to 5 mA. The PSE controller 300 removes power from the PD when the DC MPS has been absent for a duration greater than 300 ms to 400 ms. Otherwise, the PSE controller 300 does not remove power from the PD when the DC current is greater than or equal to 10 mA for at least 60 ms every 360 ms to 460 ms.

The AC MPS component is present when the PSE controller 300 detects an AC impedance at the PD equal to lower than 27 kΩ. Else, the AC MPS may be either present or absent when the PSE controller 300 detects an AC impedance between 27 kΩ and 1980 kΩ. Otherwise, the AC MPS is absent when the PSE controller 300 detects the AC impedance at the PD equal to or greater than 1980 kΩ. The PSE controller 300 removes power from the PD when the AC MPS component is absent for a time duration greater than 300 to 400 ms.

Figure 9:
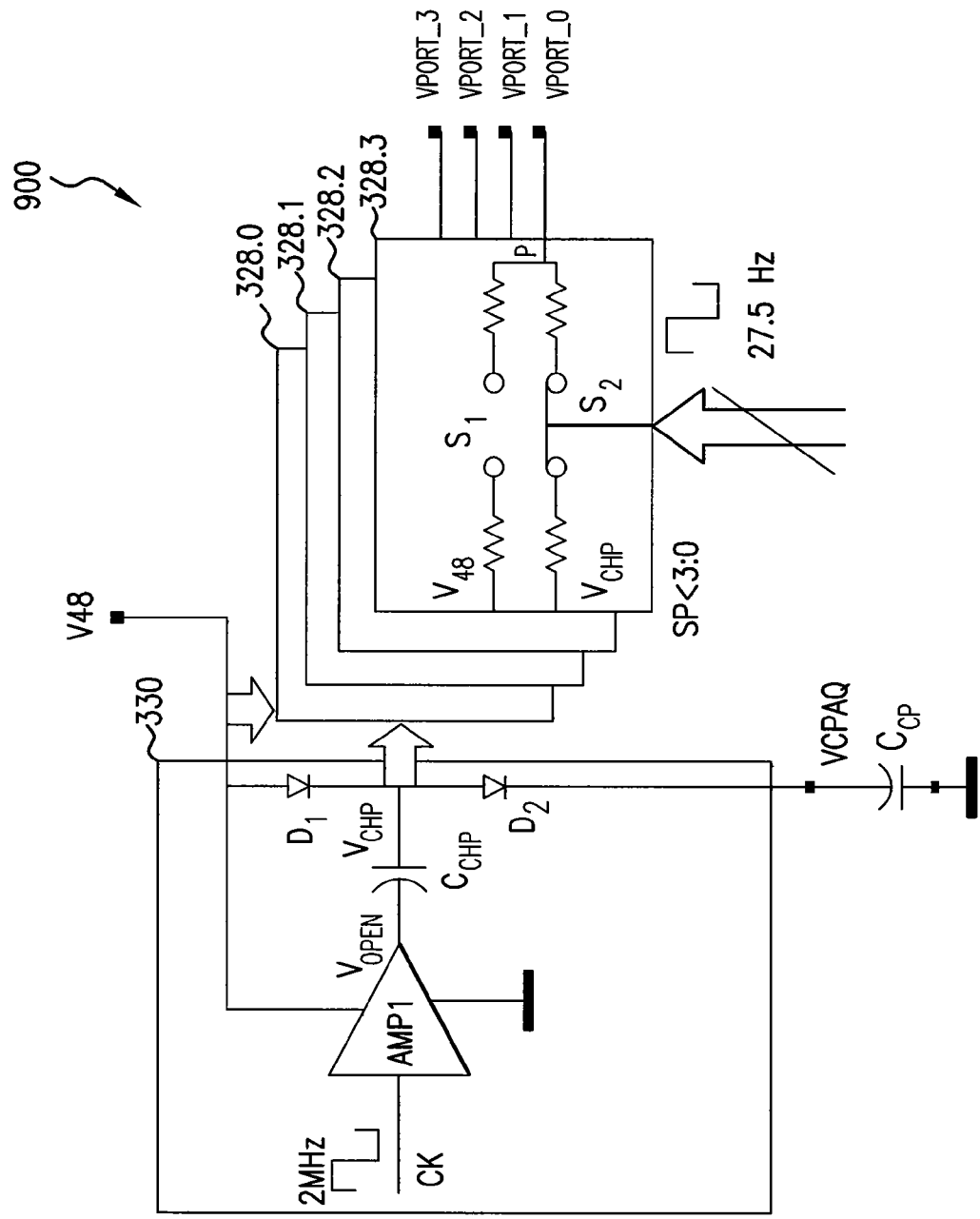
FIG. 9 is an illustration of a block diagram of an AC impedance measurement system according to an embodiment of the present invention.

The PSE controller 300 applies an AC signal generated by a charge pump onto a corresponding VPORTP pin of a PD to measure the AC impedance. FIG. 9 is an illustration of a block diagram of an AC impedance measurement system according to an embodiment of the present invention. The AC measurement system 900 includes the charge pump 330 and AC disconnect modules 328.0 through 328.3. The charge pump 330 in conjunction with a corresponding AC disconnect module 328.0 through 328.3 switches a corresponding pin from VPORT_0 through VPORT_3 between V48 and VCHP at a frequency of approximately 27.5 Hz to create an AC waveform.

The charge pump 330 is an electronic circuit that uses capacitors, $C_{CHP}$ and $C_{CP}$ as energy storage elements to create a higher voltage power source, denoted as $V_{CHP}$. The charge pump 330 forms the higher voltage power source $V_{CHP}$ through the charging and discharging of the capacitor $C_{CHP}$ depending upon the combination of the output of AMP1, denoted as $V_{OPEN}$, and the voltage of pin V48. The voltage $V_{OPEN}$ represents the VPORTP probing AC voltage and may typically range from 1.9V to 3.0V. The capacitor $C_{CP}$ is an external capacitor connected to either pin VCPA or pin VCPB (VCPA/B as shown in FIG. 3). The PDs attached ports 0 and 1 share a external capacitor $C_{CP}$ connected to pin VCPA while the PDs attached ports 2 and 3 share another external capacitor $C_{CP}$ connected to pin VCPB. To avoid loading of the charge pump 330, the timing between ports 0 and 1 and ports 2 and 3 is reversed such that only one port pair is connected to $V_{CHP}$ at a time. The charge pump 330 also includes a diode D1 to prevent the higher voltage power source $V_{CHP}$ from coupling onto the pin V48 and a diode D2 to prevent the extraneous signals on pin VCPA/B from coupling onto higher voltage power source $V_{CHP}$.

Each corresponding AC disconnect module 328.0 through 328.3 switches between the higher voltage power source VCHP and the voltage of pin V48 according to a corresponding clock from SP<3:0>. In an exemplary embodiment, the clock from SP<3:0> is centered at a frequency of approximately 27.5 Hz. More specifically, each corresponding AC disconnect module 328.0 through 328.3 switches between a switch S1 and a switch S2 depending on the clock from SP<3:0> to create the AC waveform. The AC waveform switches a corresponding pin from VPORT_0 through VPORT_3 between V48 and $V_{CHP}$.

Figure 10:
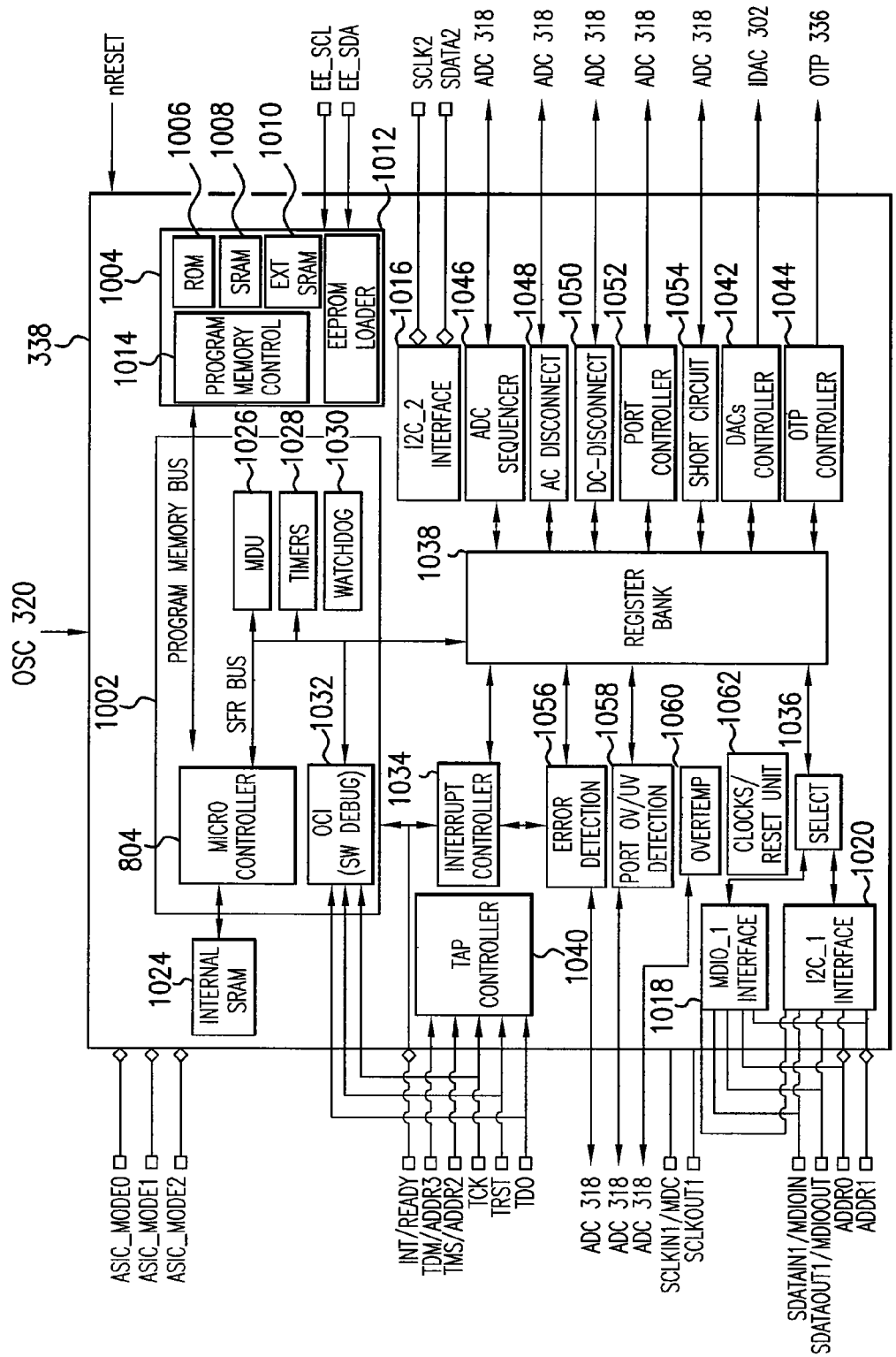
FIG. 10 is an illustration of a block diagram of the digital section of a PSE controller according to an embodiment of the present invention.

FIG. 10 is an illustration of a block diagram of the digital section of a PSE controller according to an embodiment of the present invention. A digital section 338 may provide the following exemplary functionalities to the PSE controller 300: controlling detection, classification, startup and disconnect processes for all ports through software, continuously monitoring the voltage, current and temperature at each port, provide appropriate control for a current detection digital to analog controller, provide a selectable Inter-Integrated Circuit (I2C)/Management Data Input/Output (MDIO) interface to an external micro controller for power management and monitoring activities, provide on-chip program memory in the form of a read only memory (ROM) and a static random access memory (SRAM), support firmware patch mechanism and download from external Electronically Erasable Programmable Read-Only Memory (EEPROM) into program and external data SRAM, provide access to specific special function registers, and multiple internal/external interrupts sources such as over temperature and AC disconnect to provide some examples. These exemplary functionalities are for illustrative purposes only, additional functionality may be implemented which will be apparent to those skilled in the arts.

The digital section 338 includes a microcontroller core 1002 connected to a memory 1004 via a program memory bus and an internal data SRAM 1024. The digital section 338 may perform boundary-scan testing using a Joint Test Action Group (JTAG) interface in conjunction with a TAP controller 1040. A special function register (SFR) bus connects a register bank 1038 containing multiple SFRs to the microcontroller core 1002. The register bank 1038 provides special functional registers for a measurement system analog to digital converter (ADC) sequencer 1046, an AC disconnect module 1048, a DC disconnect module 1050, a port controller 1052, a short circuit detection module 1054, a digital to analog converter (DAC) controller 1042, an error detection module 1056, a port over-voltage (OV) and under-voltage (UV) detection module 1058, and a I2C_1/MDIO_1 selection module 336. The digital section 338 further includes an overtemp module 1060 and a clocks/reset management unit 1062. The digital section 338 may interface other PSE controllers 300 via either a MDIO_1 interface 1018 and a I2C_1 interface 1020 or a an I2C_2 interface 1016.

Figure 11A:
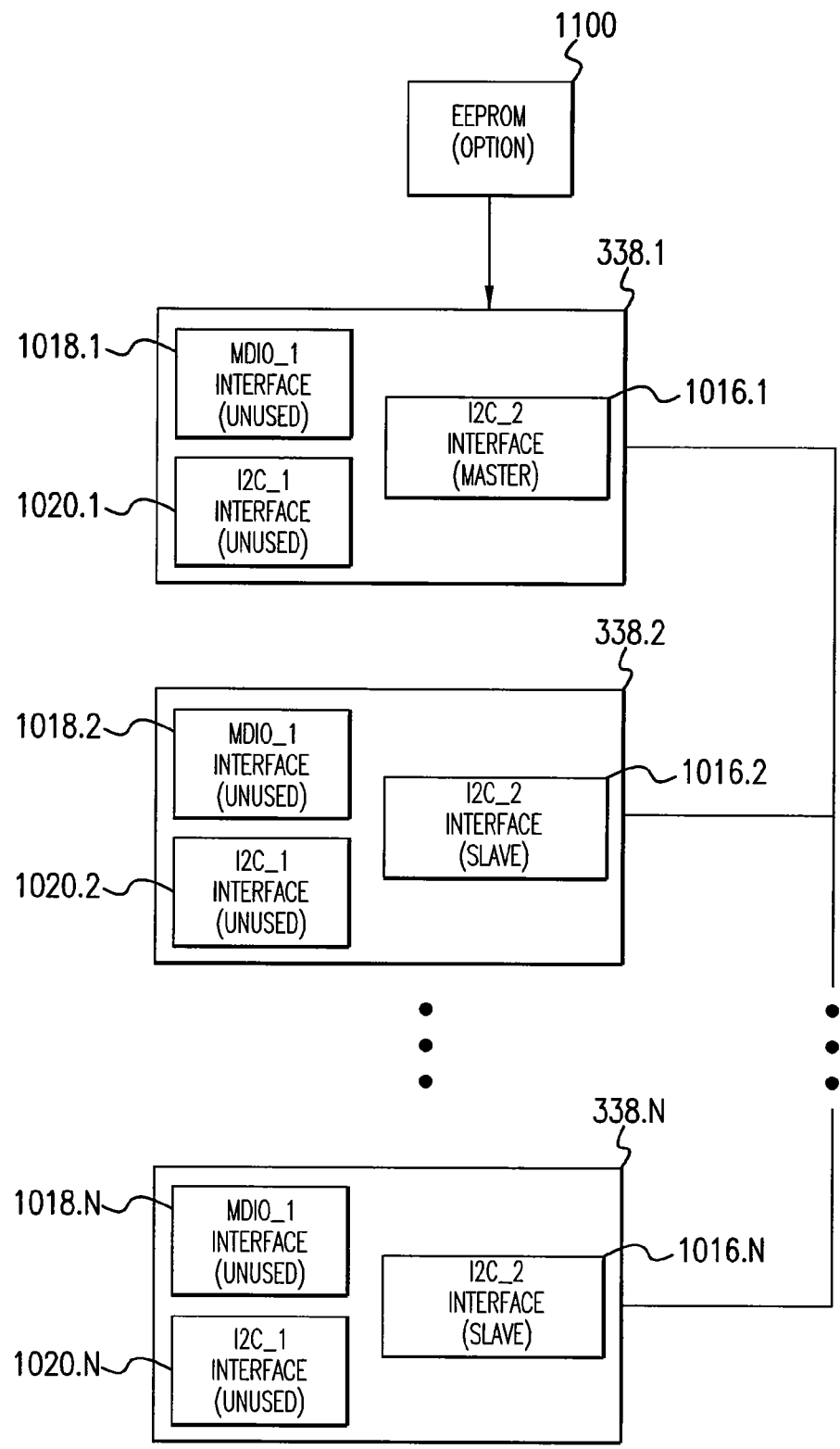
FIG. 11A is an illustration of a block diagram of unmanaged switch/autonomous mode for a PSE controller according to an embodiment of the present invention.
Figure 11B:
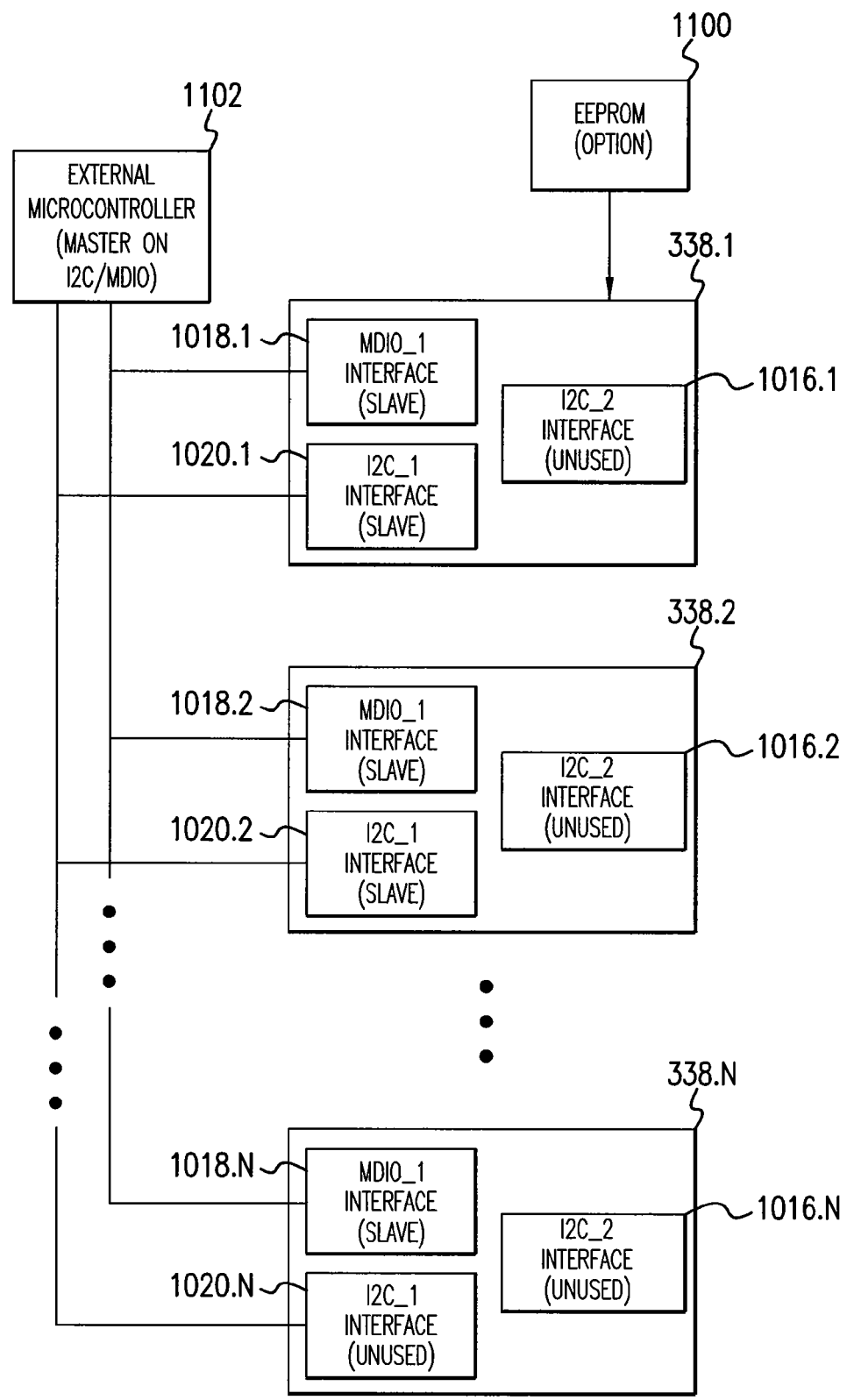
FIG. 11B is an illustration of a block diagram of a managed switch/manual mode for a PSE controller according to an embodiment of the present invention.
Figure 11C:
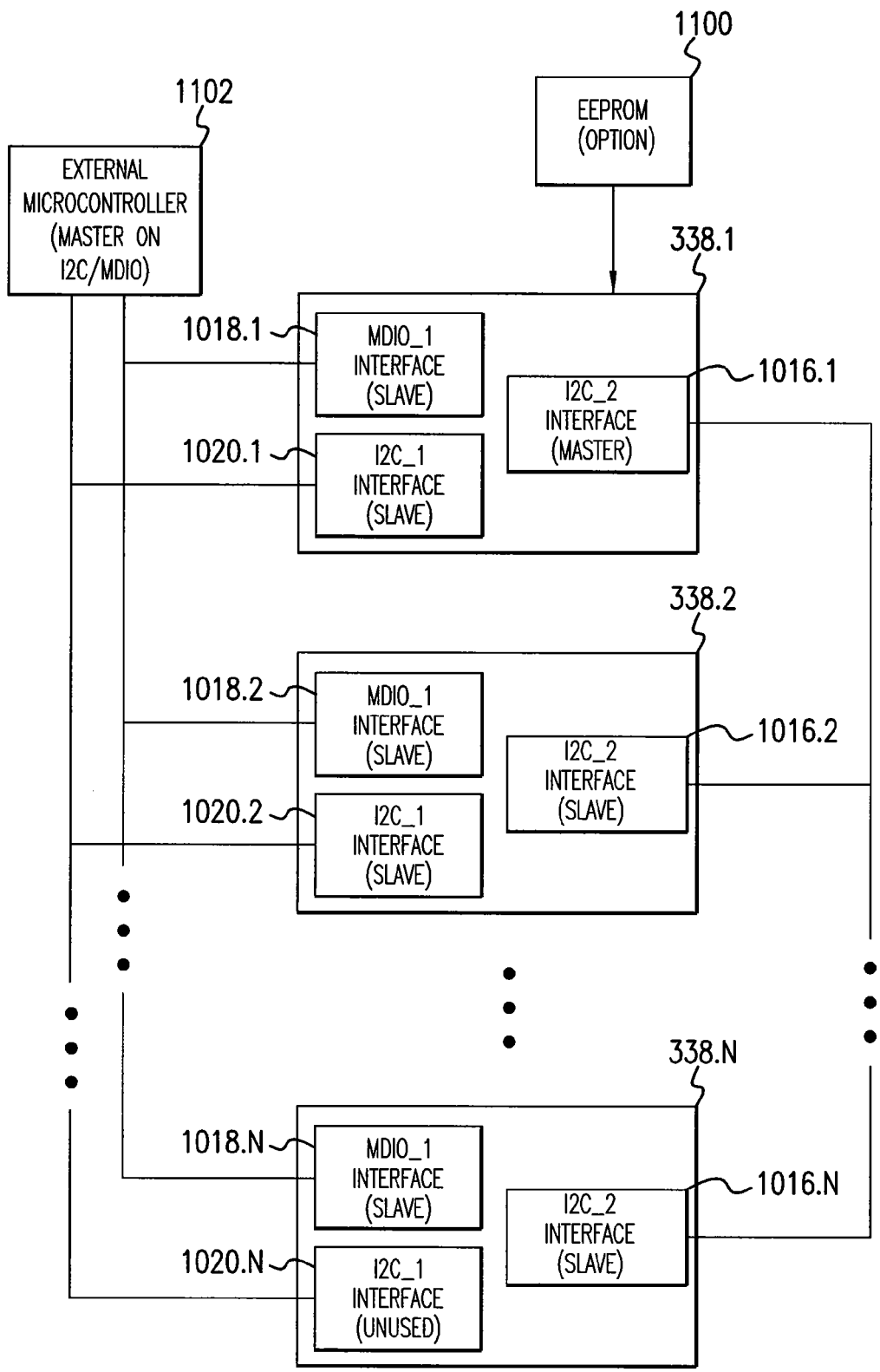
FIG. 11C is an illustration of a block diagram of a web-smart switches/semi-autonomous mode for a PSE controller according to an embodiment of the present invention.

The digital section 338 may operate in conjunction with other connecting PoE devices by operating in various modes of master/slave configurations as shown in FIG. 11A through 11C. The digital section 338 may be configured for an unmanaged switch/autonomous mode, a managed switch/manual mode, a websmart switches/semi-autonomous mode using the MDIO_1 interface 1018, I2C_1 interface 1020, and the I2C_2 interface 1016.

The I2C_1 interface 1020 and the I2C_2 interface 1016 may be implemented using a two wire synchronous serial bus according to the I2C specification. The SCLK, located at pins SCLKIN1 and SCLKOUT1 for the I2C_1 interface 1020 and pin SCLK2 for the I2C_2 interface 1016, is used as a time base for all transfer and is always driven by a master I2C. The SDATA located at pins SDATAIN1/MDION and SDATAOUT1/MDIOOUT for SCLKOUT1 for the I2C_1 interface 1020 and pin SDATA2 for the I2C_2 interface 1016, is a bi-directional serial data signal on which information is transferred. The I2C interface is well known in the art. The I2C_1 interface 1020 is used in slave mode and I2C_2 interface 1016 is used in either master or slave mode for POEA configuration.

The MDIO_1 interface 1018 serves as the MDIO Slave interface to an external CPU/microcontroller; it allows an external software driver to access the SFR registers and send the control commands to the digital section 300. The MDIO_1 interface 1018 may be implemented as a multi-drop two-wire bus consisting of a clock signal driven by the master and a bi-directional data signal driven by the master or a slave. The functionality of the MDIO_1 interface 1018 is well known in the art.

FIG. 11A is an illustration of a block diagram of unmanaged switch/autonomous mode for a PSE controller according to an embodiment of the present invention. The unmanaged switch/autonomous mode provides a low cost application eliminating the need for either an external microcontroller (not shown) or an opto-coupler (not shown). In the unmanaged switch/autonomous mode, the MDIO_1 interfaces 1018.1 through 1018.N and the I2C_1 interfaces 1020.1 through 1020.N are unused and the I2C_2 interfaces 1016.1 through 1016.N may connect to up 16 PSE controller 300 (64 ports). For this mode, the device at address #0, the PSE controller 300 containing the digital section 338.1, is always be configured as a master on the I2C_2 bus, whereas the remainder of the devices, the PSE controllers 300 containing the digital sections 338.2 through 338.N are configured as slaves. An external optional EEPROM 1100 may be included to support customized register setting and Firmware patch mechanism. In an exemplary embodiment, the external optional EEPROM 1100 is attached to pins EE_SCL and EE_SDA as shown in FIG. 10.

FIG. 11B is an illustration of a block diagram of a managed switch/manual mode for a PSE controller according to an embodiment of the present invention. The managed switch/manual mode may be implemented using an external microcontroller 1102 to behave as a master on the MDIO_1 interfaces 1018.1 through 1018.N and the I2C_1 interfaces 1020.1 through 1020.N. In the managed switch/manual mode, all PSE controllers 300 are configured as slaves and the I2C_2 interface 1016.1 through 1016.N remains unused. The power management is handled by the external microcontroller 1102, which monitors and controls all the ports in the system.

FIG. 11C is an illustration of a block diagram of a websmart switches/semi-autonomous mode for a PSE controller according to an embodiment of the present invention. In the websmart switches/semi-autonomous mode, an external microcontroller 1102 acts as a master on the MDIO_1 interfaces 1018.1 through 1018.N and the I2C_1 interfaces 1020.1 through 1020.N to monitor and extract power information from each POEA device. The external microcontroller 1102 does not issue commands to the PSE controller 300 and acts as a server to monitor the port status and collect statistical data. The device at address #0, the POEA device containing the digital section 338.1, is configured as a master on the I2C_2 interface 1016.1 and manages power over the network. An external optional EEPROM 1100 may be includes to support a mixture of customized register settings and firmware patch mechanisms.

The address for each POEA device is fixed and accessible through pins ADDR0, ADDR1, TDM/ADDR2, and TMS/ADDR3 (ADDR[3:0]) as shown in FIG. 10. Only the device at address #0 as discussed in FIG. 11A through FIG. 11C may implemented to act as a master on the MDIO_1 interface 1018 and the I2C_1 interface 1020 and/or the I2C_2 interface 1016, depending on the selected mode of operation. The mode of operation of each POEA device is determined by the pins ASIC_MODE0, ASIC_MODE1, and ASIC_MODE2 (ASIC_MODE[2:0]) as described in the table below.

| ASIC_MODE[2:0] | MODE |
| --- | --- |
| 000 | Managed switch/Manual mode |
| 001 | Managed switch/Manual mode |
| 010 | Websmart switches/Semi-autonomous |
| 011 | Websmart switches/Semi-autonomous |
| 100 | Unmanaged switch/Autonomous mode |

The MDIO_1 interface 1018 and the I2C_1 interface 1020 and the I2C_2 interface 1016 may accommodate up to 16 PSE controllers 300. In other words, 16 additional PSE controllers 300 can be connected on the MDIO_1 interface 1018/I2C_1 interface 1020 and an additional 16 PSE controllers 300 can be connected on the I2C_2 interface 1016. The I2C_1 interface 1018 and the I2C_2 interface 1016 implemented in the PSE controller 300 may address up to 128 I2C devices.

The firmware reads the ASIC_MODE[2:0] and ADDR[3:0] pins at startup to configure the PSE controller 300 accordingly. The firmware may configure the register settings or the master/slave firmware selection to provide some examples. At startup, the microcontroller 804 loads from the firmware from program ROM 1006. The program ROM 1006 contains the entire program driver for both the master and the slave mode of operation. The microcontroller 804 may also load the firmware from the external operational EEPROM 1100 when operating in either the websmart switches/semi-autonomous or the unmanaged switch/autonomous mode. Master firmware patches and their corresponding patch tables may be loaded into the program SRAM 1008 and populated to all the slaves through the I2C_2 interface 1016. The code patching mechanism is function oriented, and only requires software manipulation. Every function that will be candidate for patching has a preamble that checks if a patch for this function is available based upon the patch table that resides in external data SRAM 1010 constructed from EEPROM data. The size of the external data SRAM 1010 limits the size of the patch table. If a patch for this function is available, the code looks up the new functions' address in the program SRAM 1008 (where the patches have been downloaded from the optional external EEPROM), and branch to it. This implementation requires to early identify which function needs support for patching or not and needs to be taken into account for the software architecture definition.

Figure 12A:
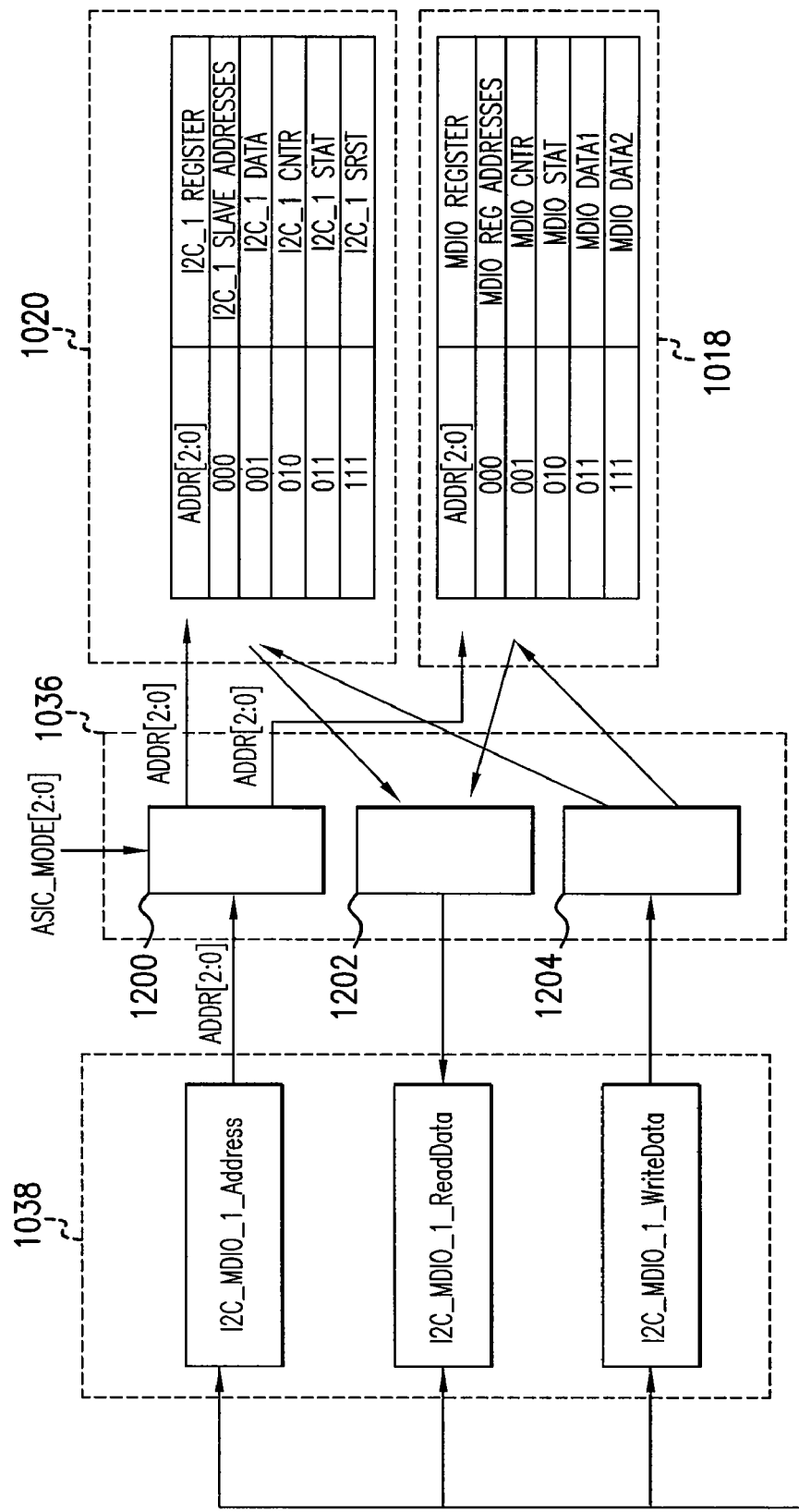
FIG. 12A is an illustration of the indirect addressing mechanism used to select between the Inter-Integrated Circuit (I2C) interface and a Management Data Input/Output (MDIO) interface according to an embodiment of the present invention.

FIG. 12A is an illustration of the indirect addressing mechanism used to select between the Inter-Integrated Circuit (I2C) interface and a Management Data Input/Output (MDIO) interface according to an embodiment of the present invention. The selection between the MDIO_1 interface 1018 and the I2C_1 interface 1020 is fully static and depends on the mode of operation. Access to the selected internal registers within either MDIO_1 interface 1018 or the I2C_1 interface 1020 is provided using indirect addressing via special function registers (SFR) within the register bank 1038. The SFRs include an I2C_MDIO_1_Address register, an I2C_MDIO_1_WriteData register, and an I2C_MDIO_1_ReadData register. The I2C_MDIO_1_WriteData register includes data from the microcontroller 804 to either the MDIO_1 interface 1018 or the I2C_1 interface 1020, while the I2C_MDIO_1_ReadData register includes data from either the MDIO_1 interface 1018 or the I2C_1 interface 1020 to the microcontroller 804.

These particular SFR registers are shared by the MDIO_1 interface 1018 and the I2C_1 interface 1020 since only one interface can be selected at a time by I2C_/MDIO_1 select module 1036. The I2C_1/MDIO_1 select module 1036 includes multiplexers 1200 through 1204. The multiplexers select between either MDIO_1 interface 1018 or the I2C_1 interface 1020 based upon the value of ASIC_MODE[2:0] and ADDR[2:0]. The value of ASIC_MODE[2:0] selects between the MDIO_1 interface 1018 or the I2C_1 interface 1020 while the value of ADDR[2:0] determines which I2C/MDIO register is to be accessed. Depending of the value of ADDR[2:0], the select module 1036 may access the following registers of I2C_1 interface 1020: I2C_1 SLAVE ADDRESSES registers, I2C_1 DATA register, I2C_1 CNTR register, a I2C_1 STAT register, and a I2C_1 SRST registers. Similarly, depending of the value of ADDR[2:0], the select module 1036 may access the following registers of the MDIO_1 interface 1018: MDIO REG ADDRESSES registers, a MDIO CNTR register, a MDIO STAT register, a MDIO_DATA1 register, and a MDIO_DATA2 register.

Figure 12B:
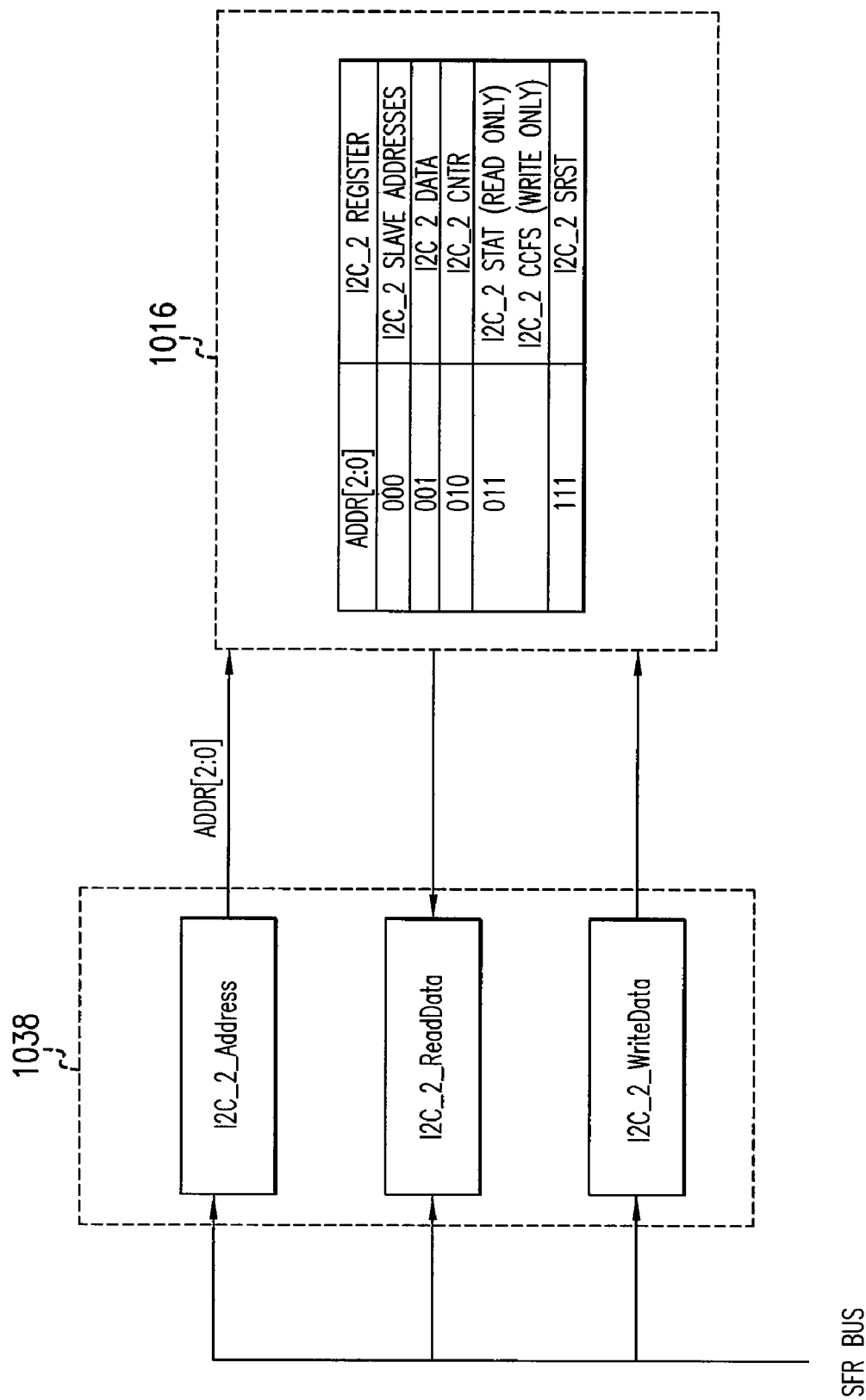
FIG. 12B is an illustration of the indirect addressing mechanism used to access a second Inter-Integrated Circuit (I2C) interface according to an embodiment of the present invention.

FIG. 12B is an illustration of the indirect addressing mechanism used to access a second Inter-Integrated Circuit (I2C) interface according to an embodiment of the present invention. Access to the internal registers of the I2C_2 interface 1016 is provided using indirect addressing via the SFR registers of register bank 1038. The SFRs include an I2C_2_Address register, an I2C_2_ReadData register, and an I2C_2_WriteData register. The I2C_2 WriteData register includes data from the microcontroller 804 to the I2C_2 interface 1016, while the I2C_2_ReadData register includes data from the I2C_2 interface 1016 to the microcontroller 804. Depending on the value of ADDR[2:0], the following registers of the I2C_2 interface 1016 are accessible to the microcontroller 804 via the SFR bus: an I2C_2 DATA register, an I2C_2 CNTR register, an I2C_2 STAT (READ ONLY) register, an I2C_2 CCFS (WRITE ONLY) register, and an I2C_1 SRST register.

Although FIG. 10, FIG. 11A through 11C, and FIGS. 12A and 12B depicts one alternative for interfacing multiple PSE controllers, as would be appreciated by persons of skill in the art, other alternatives can be used to interface multiple PSE controllers. For example, a universal asynchronous receiver/transmitter (UART) interface may be used in conjunction with the I2C interface.

Referring back to FIG. 10, the microcontroller core 1002 is based on 8-bit microcontroller architecture to allow for flexibility over the implementation of a conventional PSE controller by avoiding the need for an external microcontroller in some configurations. In an exemplary embodiment, the microcontroller core 1002 is an improved upon a conventional 8501 core. The conventional 8501 core is an industry standard that is well known in the art. To save area over the conventional 8501 core, unnecessary peripherals are removed from the conventional 8501 core.

The microcontroller core 1002 includes an 8-bit microcontroller 804 to access a memory 1004 through a program memory controller 1014 attached to a program memory bus. In addition to the program memory controller 1014, the memory 1004 may include a program ROM 1006, a program SRAM 1008, an external data SRAM 1010, and an EEPROM loader 1012. In an exemplary embodiment, the microcontroller 804 is implemented according to the well known Harvard architecture having a separate program and a data space. The program ROM 1006 and the program SRAM 1008 represent the program space, and the external data SRAM 1010 and the internal data SRAM 1024 represent the data space. Program memory space is mapped to both the program ROM 1006 and the program SRAM 1008. The usage and the mapping of the program ROM 1006 and the program SRAM 1008 depends on the selected mode of operation and on the availability of the external EEPROM 1100. The EEPROM loader 1012 may load the content of the external EEPROM 1100, when available, into the program SRAM 1008. The EEPROM loader 1012 executes read byte commands using a 2-wire pseudo-I2C interface. The EEPROM loader 1012 is intended to be used as a read-only interface. The digital section 338 does not write or program to the external EEPROM 1100 (not shown in FIG. 10) connected to the EEPROM loader 1012. The EEPROM loader 1012 may download startup for the registers in a master and/or a slave configuration. For example, the master needs to know the total power available for allocation in a system. The EEPROM loader 1012 may also download code to patch errors in the firmware code stored in program ROM 1006. The EEPROM loader 1012 may further download code containing additional features/functions not available in the firmware code. A register set in the EEPROM loader 1012 is used to communicate to the microcontroller 804. The microcontroller 804 uses the register set to configure and monitor the serial EEPROM download process. Detection of the external serial EEPROM 1100 (not shown in FIG. 10) is accomplished by detecting of a four-byte sequence. If the loader detects the sequence, an external EEPROM 1100 is attached. Otherwise, no external EEPROM 1100 is attached.

Data memory space is mapped to both the internal data SRAM 1024 and the external data SRAM 1008. In an exemplary embodiment, the internal data SRAM 1024 is 256 bytes in length and may fabricated within the microcontroller core 1002. An external data memory 310 may provide support to the firmware patch mechanism and additional data storage capabilities. The EEPROM loader 1012 can load code from the external EEPROM 1100, when available, into the external data SRAM 1008. The external data SRAM 1008 is physically connected to the same bus as the program ROM 1006 and the program SRAM 1008.

The microcontroller core 1002 may access special functions, such as a multiplication division unit (MDU) 1026, a timer module 1028, or on-chip instrumentation (OCI) interface 1032, using a SFR bus. The MDU unit 1026 is an on-chip arithmetic unit to provide 32-bit division, 16-bit multiplication shift and normalize features. The MDU unit 1026 is primarily used to process and correct the voltage, the temperature, and the current measurements as discussed in FIG. 8A and FIG. 8B. The timer 1028 includes two 16-bit timers that may be used for delay implementation by software. Because the microcontroller core 1002 is an improved upon conventional 8501 core, delay loops implemented in software may behave differently from other 8501 cores therefore the delay loops may be implemented using the timer 1028 instead of software. The OCI interface 1032 interfaces the microcontroller core 1002 to external debugging hardware. The OCI interface 1032 further enhances the microcontroller core 1002 by providing run control, memory and register visibility, complex breakpoints, and a trace history feature without using any resources of the microcontroller core 1002.

The microcontroller core 1002 further includes a watchdog timer 1030. The watchdog timer 1030 triggers a system reset if the main program, due to some fault condition, such as a hang, neglects to regularly service the watchdog, for example, by writing a service pulse. The intention is to bring the system back from the hung state into normal operation.

The digital section 338 is interrupt-driven. An interrupt is an asynchronous signal from hardware indicating the need for attention or a synchronous event in software indicating the need for a change in execution. A hardware interrupt causes the microcontroller core 1002 to save its state of execution via a context switch, and begin execution of an interrupt handler. Software interrupts are usually implemented as instructions in the instruction set, which cause a context switch to an interrupt handler similarly to a hardware interrupt. Interrupts are a commonly used technique for computer multitasking, especially in real-time computing. The digital section 338 includes an interrupt controller 1034 to process the interrupts. In an exemplary embodiment, the interrupt controller supports 13 interrupt sources with four priority levels. Apart from the conventional 8501 pre-assigned interrupts, a communication interface I2C_1/I2C_2/MDIO interrupt, an external interrupt source from pin nINT/READY, a measurement system interrupt, and/or port specific interrupts such as a port 0 event to provide some examples may also be implemented.

Figure 12C:
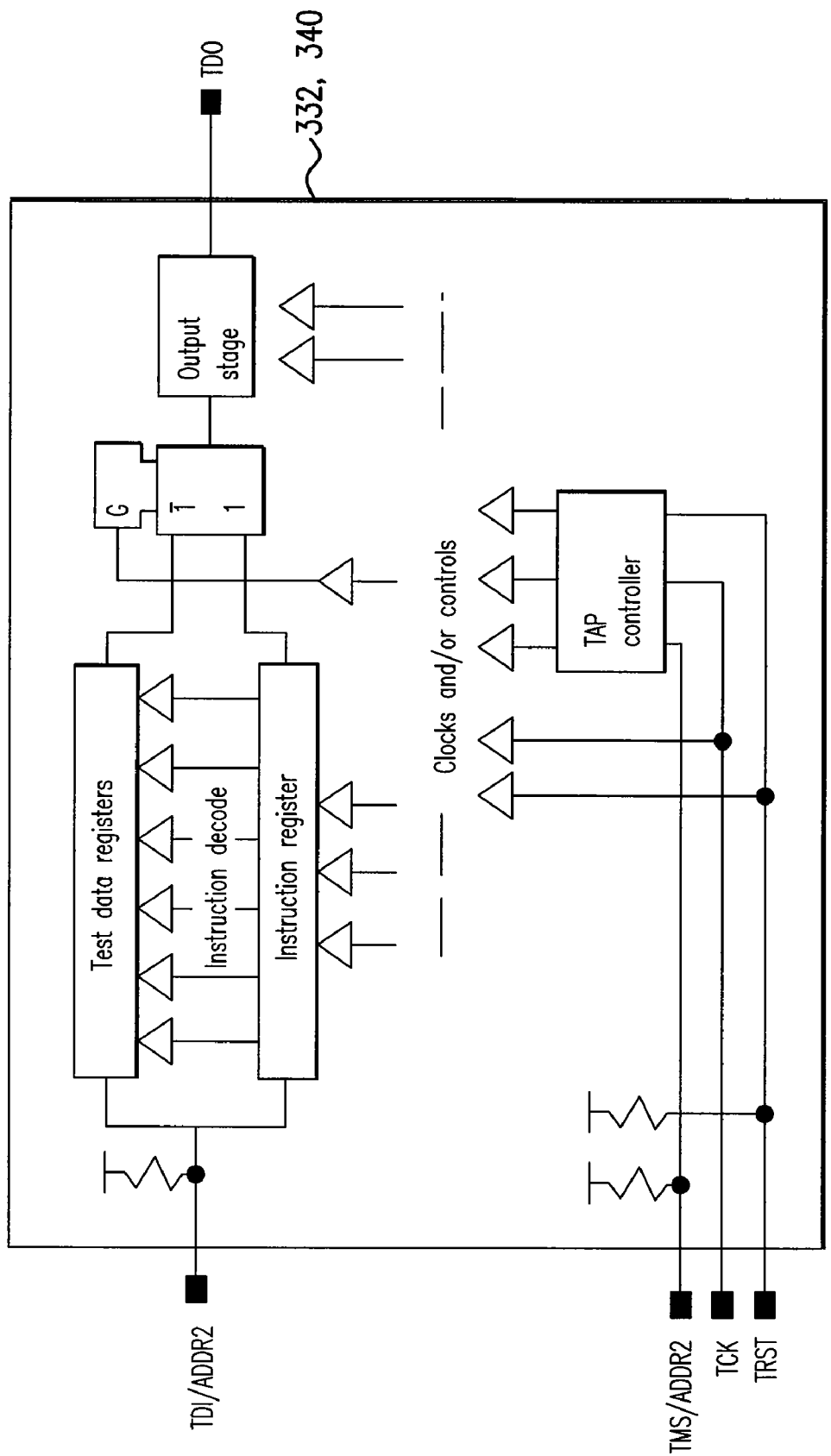
FIG. 12C is an illustration of a block diagram a Joint Test Action Group (JTAG) interface of a PSE controller according to an embodiment of the present invention.
Figure 13:
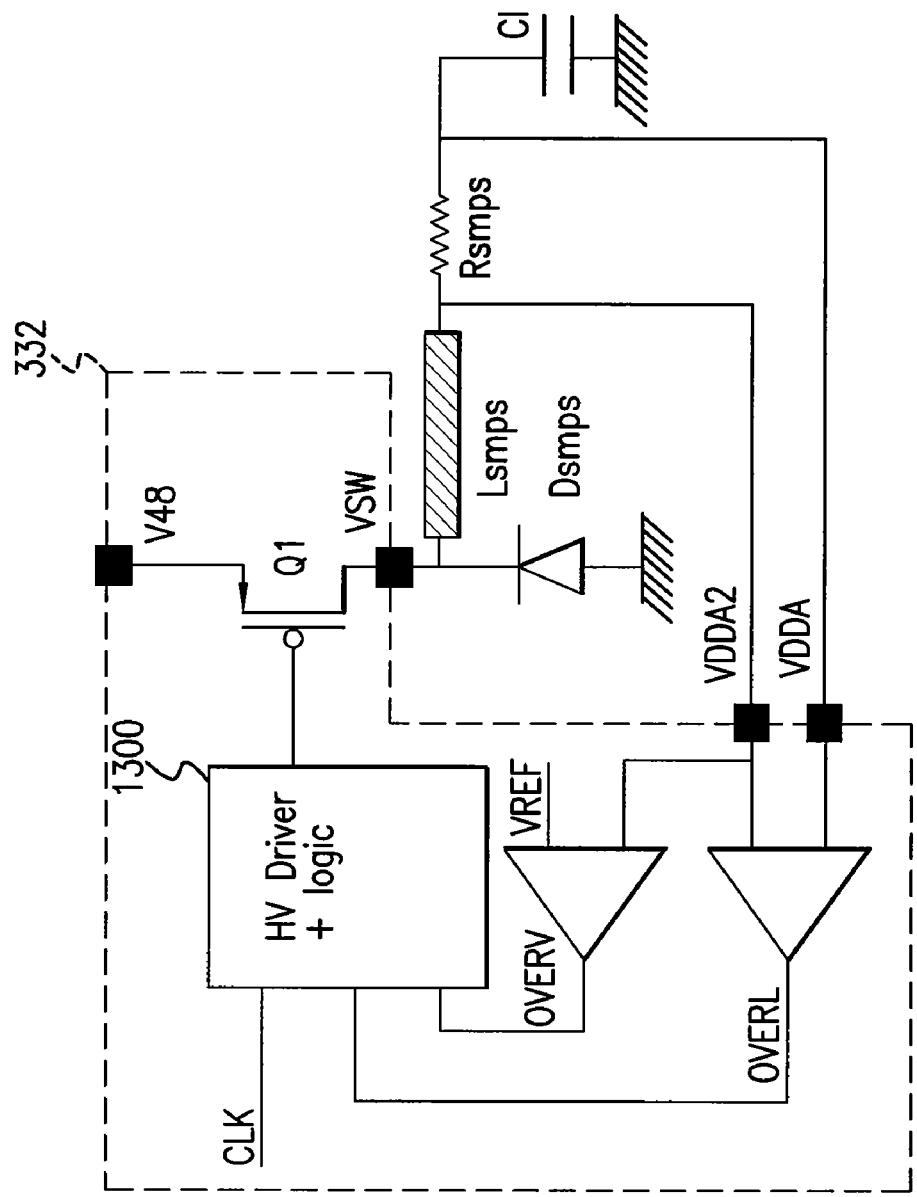
FIG. 13 is an illustration of a block diagram a switched mode power supply (SMPS) according to an exemplary embodiment of the present invention.

FIG. 12C is an illustration of a block diagram a Joint Test Action Group (JTAG) interface of a PSE controller according to an embodiment of the present invention. The control of the OCI interface 1032 is through pins TCK, TRST, and TD0 of the JTAG interface. The JTAG interface performs boundary-scan testing according to the well known IEEE 1149.1 standard entitled Standard Test Access Port and Boundary-Scan Architecture for test access ports used for testing with a boundary scan technique. The JTAG interface of the digital section 338 is controlled through pins TDM/ADDR3, TMS/ADDRR2, TCK, TRST, and TD0 as shown in FIG. 12C. As shown in FIG. 12C, the basic elements of JTAG interface include Test Access Port (TAP) pins, a TAP controller and test registers. FIG. 13 depicts the JTAG architecture of a device with one TAP. The digital section 338 is implemented with two TAP controllers. The first TAP is the main one identified as the TAP controller 340, used for testability and accessibility of internal nodes of the digital section 338. The second TAP is the TAP controller included in the OCI interface 332. As shown in FIG. 10, pins TMS, TCK and TRST are connected in parallel the TAP controller 1040 and the OCI interface 1032. The TAP controller 1040 is a synchronous finite state machine that responds to changes at the TMS and TCK signals of the TAP and controls the sequence of operations of the JTAG circuitry of the device. The pin TDI/ADDR3 is connected to the TAP controller 1040. The pin TDO will be connected to TDI pin of the OCI interface 1032, while the TDO pin of the TAP controller 1040 will be the one in the OCI interface 1032.

Referring back to FIG. 10, the digital section 338 further includes a measurement system ADC sequencer 1046, an AC disconnect module 1048, a DC disconnect module 1050, a port controller 1052, a short circuit module 1054, a DACs controller 1042, an error detection module 1056, a port overvoltage/undervoltage (OV/UV) detection module 1058, and an overtemp module 1060.

The measurement system ADC sequencer 1046, the AC disconnect module 1048, the DC disconnect module 1050, the port controller 1052, the short circuit module 1054, the DACs controller 1042, the error detection module 1056, the port overvoltage/undervoltage (OV/UV) detection module 1058, and the overtemp module 1060 receive data from the ADC 318. The measurement system ADC sequencer 1046 is an exemplary embodiment of the measurement system FSM 802 as discussed in FIG. 8. The AC disconnect module 1048 determines the presence or absence of the AC MPS component. The DC disconnect module 1050 determines the presence or absence of the DC MPS component. The multiplexer 308 uses the port controller 1052 controller in conjunction with the measurement system ADC sequencer 1046 to generate the time division multiplexing scheme as discussed in FIG. 7. The short circuit module 1054 is used to detect a short circuit as discussed in FIG. 4A through 4D. The DACs controller 1042 provides the two-bit control line for the switches SW1 through SW5 of the IDAC 304 as shown in FIG. 4A. The error detection module 1056 sends a signal to the interrupt controller 1034 to generate an interrupt upon the occurrence of predetermined error conditions, such as a short circuit or an open load condition to provide some examples. The port overvoltage/undervoltage (OV/UV) detection module 1058 is used to detect an OV/UV condition in FIG. 4A through 4D. The overtemp module 1060 detection module 1058 is used to detect an over-temperature condition in FIG. 4A through 4D.

Referring back to FIG. 3, the PSE controller includes a VDDA/V48 power monitor 334 to monitor the voltage of pins VDDA and/or V48 and may include an optional a switched mode power supply (SMPS) 332 to regulate the voltage on pin V48 to a suitable level to provide power to the modules of the PSE controller 300. The SMPS 332 is an electronic power supply unit that incorporates a switching regulator to provide greater efficiency as compared to a linear regulator.

FIG. 13 is an illustration of a block diagram a switched mode power supply (SMPS) according to an exemplary embodiment of the present invention. As shown in FIG. 13, an inductor $L_{SMPS}$, a diode $D_{SMPS}$, a resistor $R_{SMPS}$, and a capacitor $C_L$ are external components. The SMPS 332 may deliver power to multiple PSE controllers 300 through pin VDDA2 and pin VDDA. The pin TESTANA is used to enable or disable the SMPS 332. A test multiplexer 324 selects mode of operation of the SMPS 332 based upon the pin TESTANA. The SMPS 332 is implemented as a buck-regulator designed to convert 48V to 3.3V. A buck regulator is a step-down DC to DC converter and is known in the art.

As shown in FIG. 13, a transistor Q1 is switched rapidly on and off to stabilize the output voltage, VSW, depending on HV driver and logic 1400. The HV driver and logic 1400 also provides overload, denoted as OVERL, and overvoltage, denoted as OVERV, protection. More specifically, the HV driver and logic 1400 provides overload protection by comparing the load on pin VDDA2 with the load on pin VDDA and adjusting the switching of Q1 based upon that comparison. The HV driver and logic 1400 provides overvoltage protection by comparing the pin VDDA2 with a reference voltage and adjusting the switching of Q1 based upon that comparison.

To help decrease the charge-up time for the external capacitor $C_L$, a pre-charge resistor (not shown in FIG. 13) connected from V48 to VDDA may be used. This resistor also supplies power to the internal oscillator 320, which needs to be running before SMPS turns ON. The SMPS clock rate, denoted as CLK, is OTP programmable between 250 kHz and 285.724 kHz and is synchronized with the ADC clock.

Figure 14:
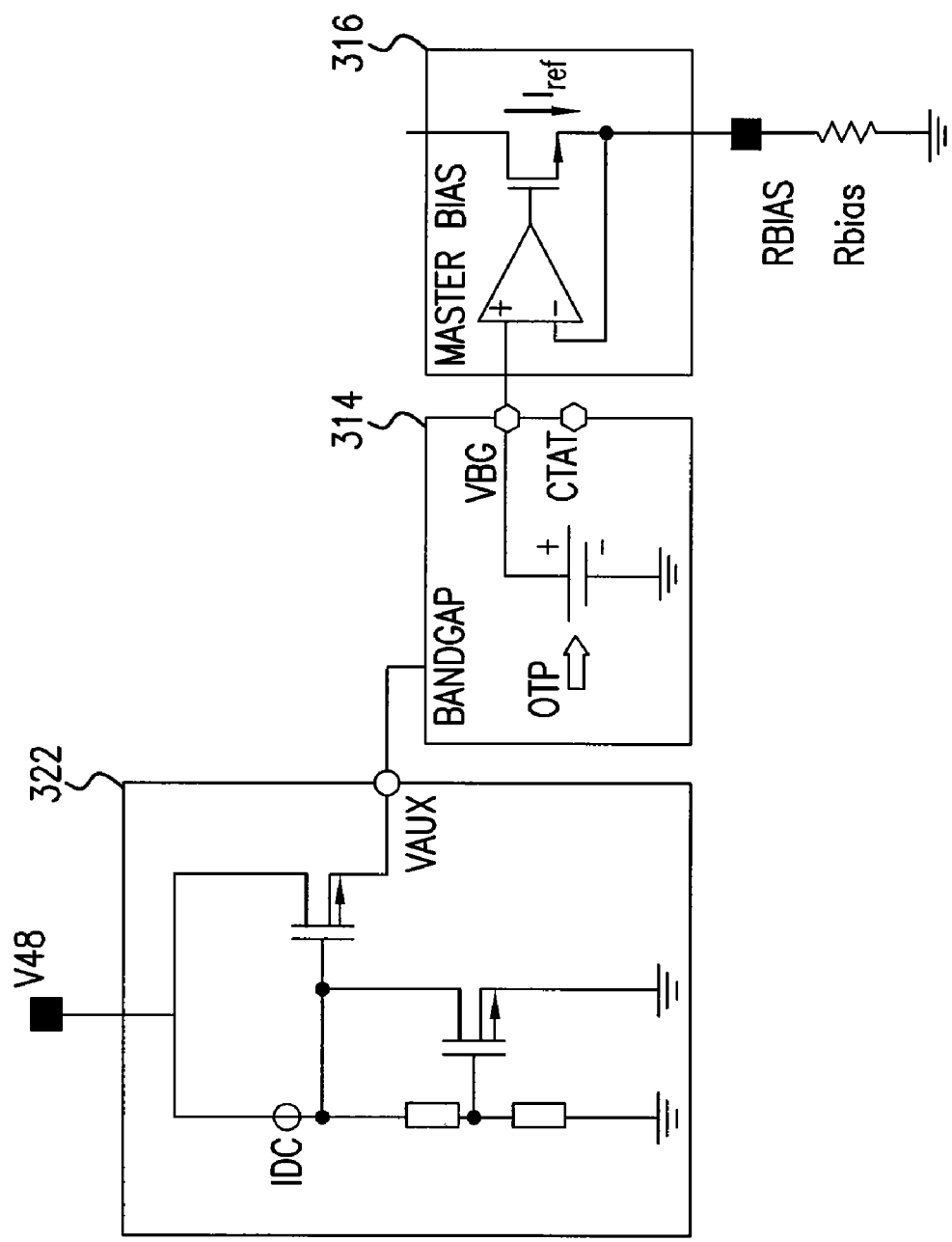
FIG. 14 is an illustration of a block diagram a start up power supply according to an exemplary embodiment of the present invention.

An internal start up supply 322 supplied from V48 is used to make a bandgap reference voltage as well as start an internal oscillator 320 and the SMPS 322. The internal oscillator 320 is used to provide the clock signal for the digital section 338. FIG. 14 is an illustration of a block diagram a start up power supply according to an exemplary embodiment of the present invention. As shown in FIG. 14, the startup supply 322 is coupled to the reference generator 316 via the bandgap reference generator 314. The startup supply 322 is implemented using an internal voltage regulator to make the bandgap reference voltage, denoted as VBG, and to generate a temperature dependent voltage, denoted as CTAT, used for the over temperature function. The bandgap is trimmed by OTP bits from OTP 336.

Referring back to FIG. 3, to indicate the status of the PSE controller 300, such as power on or power off to provide some examples, the PSE controller 300 further includes a LED (light emitting diode) driver 310 coupled to corresponding external LEDs (not shown in FIG. 3). In an exemplary embodiment, the LED driver 310 contains four circuits where each circuit may be used to independently drive the four external LEDs connected to pins LED0 through LED3.

Figure 15:
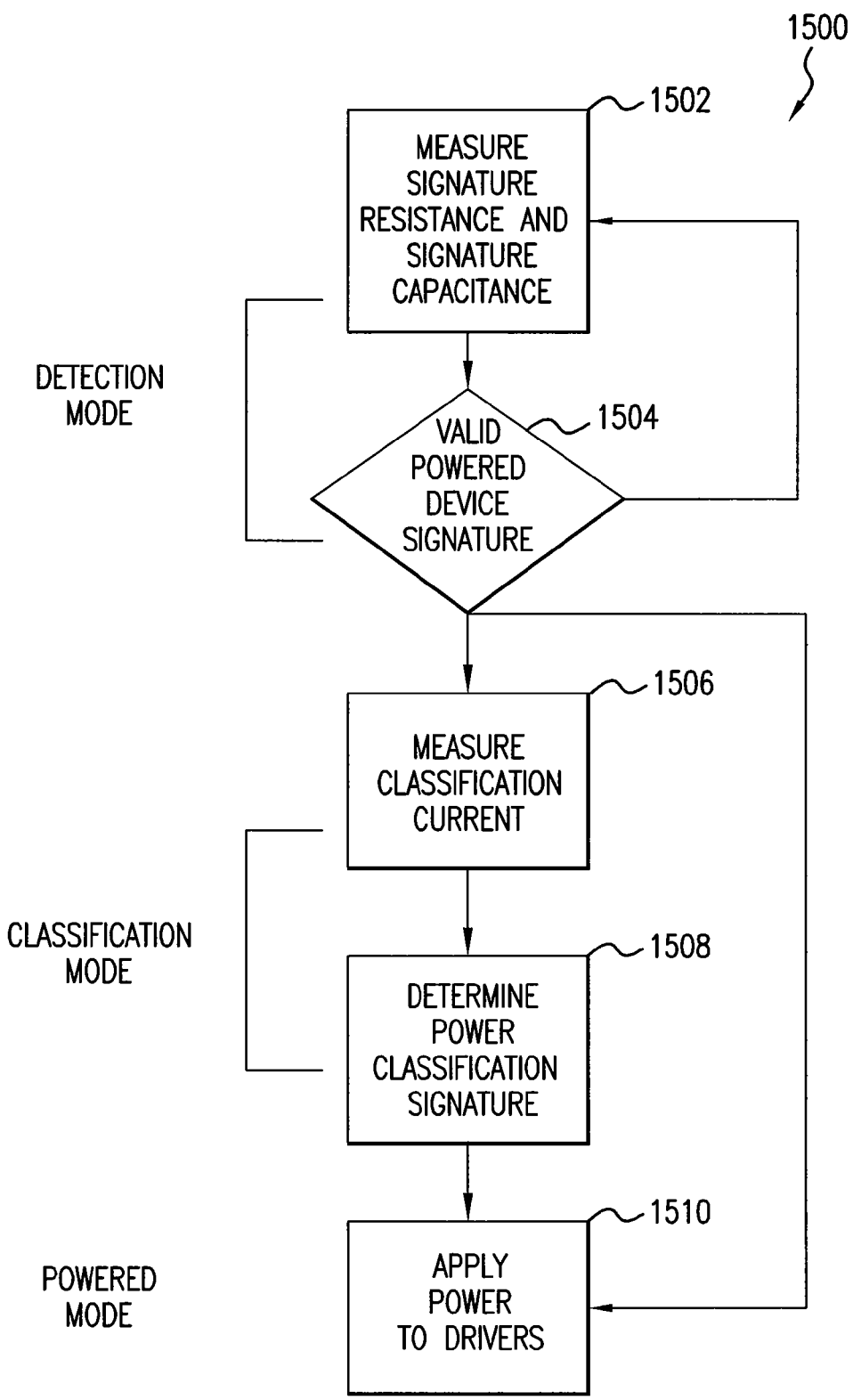
FIG. 15 is a flowchart of exemplary operational steps of a Power Source Equipment (PSE) controller according to an aspect of the present invention.

FIG. 15 is a flowchart of exemplary operational steps of a Power Source Equipment (PSE) controller according to an aspect of the present invention. The invention is not limited to this operational description. Rather, it will be apparent to persons skilled in the relevant art(s) from the teachings herein that other operational control flows are within the scope and spirit of the present invention. The following discussion describes the steps in FIG. 15.

At step 1502, the PSE controller enters the detection mode of operation by measuring the signature resistance and signature capacitance of an attached PD. A current is applied from a current source, such as IDAC 302, to a PD to measure the voltage across the ports of the PD. After measuring the voltage with a voltage measurement system, such as voltage measurement system 630, the PSE controller proceeds to step 1504.

At step 1504, the signature resistance and the signature capacitance is determined from the voltage measurement of step 1502. A valid power device signature occurs when the signature resistance is from 19 kΩ to 26.5 kΩ and the signature capacitance is less than 150 nF. If a valid power device is not found, the PSE controller proceeds to back to step 1502. If a valid power device is found, the PSE controller may proceed either to step 1506 or step 1510.

Step 1506 is an optional step, otherwise the PSE controller proceeds to step 1510. At step 1506, the PSE controller enters the classification mode of operation by measuring the classification current of the PD by comparing a voltage applied to the PD with a classification reference voltage using a classification circuit such as classification circuit 500. After measuring the current with a current measurement system, such as current measurement system 600, the PSE controller proceeds to step 1508.

At step 1508, the power classification signature is determined by the PSE controller. The PSE controller measures the classification current and classifies the PD based upon the measured classification current of step 1506. At step 1510, the PSE controller enters the powered mode by applying power to driver circuitry and begins to measure the current, voltage, and temperature of each port.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. An apparatus for classifying a powered device (PD) within a Power-over-Ethernet (PoE) system, comprising:
   a preamplifier configured to receive a differential input voltage from the PD and to convert the differential input voltage to a single ended output; and
   a classification module configured to compare the single ended output to a classification reference voltage to provide a classification current, the classification current being used to classify the PD.

2. The apparatus of claim 1, wherein the preamplifier comprises:
   an operational amplifier configured to convert the differential input voltage to the single ended output.

3. The apparatus of claim 2, wherein a gain of the operational amplifier is substantially equal to one.

4. The apparatus of claim 2, wherein a shunt resistor is coupled to a non-inverting input of the operational amplifier, a first series resistor is coupled between the non-inverting input of the operational amplifier and the PD, a feedback resistor is coupled between an inverting input of the operational amplifier and an output of the operational amplifier, and a second series resistor is coupled between the inverting input of the operational amplifier and the PD.

5. The apparatus of claim 4, wherein the shunt resistor, the feedback resistor, the first series resistor, and the second series resistor are implemented using a material with a sheet Rho approximately 1 kohm/square.

6. The apparatus of claim 1, wherein the classification module comprises:
   a comparator configured to compare the single ended output to the classification reference voltage.

7. The apparatus of claim 6, wherein the classification module comprises:
   a main driver switch configured to provide the classification current based upon an output of the comparator.

8. The apparatus of claim 1, wherein the classification module comprises:
   a main driver switch configured to provide the classification current.

9. The apparatus of claim 1, further comprising:
   a current measurement system configured to measure the classification current to provide a measured classification current.

10. The apparatus of claim 9, wherein the PD is classified as a Class 0 when the measured classification current is between 0 mA to 5 mA, a Class 1 when the measured classification current is between 8 mA and 13 mA, a Class 2 when the measured classification current is between 16 mA and 21 mA, a Class 3 when the measured classification current is between 25 mA and 31 mA, and a Class 4 when the measured classification current is between 35 mA and 45 mA.

11. A Power over Ethernet (PoE) system, comprising:
   a powered device (PD) configured to output a differential voltage; and
   a Power Source Equipment (PSE) configured to receive the differential voltage, the PSE including:
      a preamplifier configured to convert the differential voltage to a single ended output; and
      a classification module configured to compare the single ended output to a classification reference voltage to produce a classification current,
      wherein the PSE is configured to classify the PD based on the classification current.

12. The system of claim 11, wherein the preamplifier comprises:
   an operational amplifier configured to convert the differential voltage to the single ended output.

13. The system of claim 12, wherein a gain of the operational amplifier is substantially equal to one.

14. The system of claim 12, wherein a shunt resistor is coupled to a non-inverting input of the operational amplifier, a first series resistor is coupled between the non-inverting input of the operational amplifier and the PD, a feedback resistor is coupled between an inverting input of the operational amplifier and an output of the operational amplifier, and a second series resistor is coupled between the inverting input of the operational amplifier and the PD.

15. The system of claim 14, wherein the shunt resistor, the feedback resistor, the first series resistor, and the second series resistor are implemented using a material with a sheet Rho approximately 1 kohm/square.

16. The system of claim 11, wherein the classification module comprises:
   a comparator configured to compare the single ended output to the classification reference voltage.

17. The system of claim 16, wherein the classification module comprises:
   a main driver switch configured to provide the classification current based upon an output of the comparator.

18. The system of claim 11, wherein the classification module comprises:
   a main driver switch configured to provide the classification current.

19. The system of claim 11, further comprising:
   a current measurement system configured to measure the classification current to provide a measured classification current.

20. The system of claim 19, wherein the PD is classified as a Class 0 when the measured classification current is between 0 mA to 5 mA, a Class 1 when the measured classification current is between 8 mA and 13 mA, a Class 2 when the measured classification current is between 16 mA and 21 mA, a Class 3 when the measured classification current is between 25 mA and 31 mA, and a Class 4 when the measured classification current is between 35 mA and 45 mA.

21. The system of claim 11, wherein the PD is classified into a respective class from among a plurality of classes based upon the classification current.

22. A method for classifying a powered device (PD) in a Power over Ethernet (PoE) system, comprising:
   receiving a differential input voltage from the PD;
   converting the differential input voltage to a single ended output;
   comparing the single ended output to a classification reference voltage to produce a classification current; and
   classifying the PD based on the classification current.

23. The method of claim 22, further comprising the step of:
   applying a classification voltage to the PD to generate the differential input voltage.

24. The method of claim 23, wherein the classification voltage is from 15.5V to 20.5V.

25. The method of claim 22, wherein the step of converting the differential input voltage to a single ended output is performed by an operational amplifier.

26. The method of claim 22, wherein the step of comparing the single ended output to a classification reference voltage is performed by a comparator.

27. The method of claim 22, wherein the classification current is produced by a main driver switch.

28. The method of claim 22, wherein the step of classifying the PD based on the classification current further comprises:
   classifying the PD as a Class 0 when a measured classification current is between 0 mA to 5 mA, a Class 1 when the measured classification current is between 8 mA and 13 mA, a Class 2 when the measured classification current is between 16 mA and 21 mA, a Class 3 when the measured classification current is between 25 mA and 31 mA, and a Class 4 when the measured classification current is between 35 mA and 45 mA.

29. The apparatus of claim 1, wherein the PD is classified into a respective class from among a plurality of classes based upon the classification current.

* * * * *